United States Patent
Butler et al.

(10) Patent No.: US 12,536,865 B2
(45) Date of Patent: Jan. 27, 2026

(54) SYSTEMS AND METHODS FOR MOBILE KIOSK REMOTE ADMINISTRATION IN ELECTRONIC GAMING

(71) Applicant: Aristocrat Technologies, Inc., Las Vegas, NV (US)

(72) Inventors: Robert Brett Butler, Austin, TX (US); Jason Riggs, Austin, TX (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 531 days.

(21) Appl. No.: 17/957,136

(22) Filed: Sep. 30, 2022

(65) Prior Publication Data

US 2024/0112532 A1  Apr. 4, 2024

(51) Int. Cl.
*G07F 17/32* (2006.01)
*G06Q 20/18* (2012.01)

(52) U.S. Cl.
CPC ......... *G07F 17/3227* (2013.01); *G06Q 20/18* (2013.01); *G07F 17/3209* (2013.01)

(58) Field of Classification Search
CPC .. G07F 17/3227; G07F 17/3209; G06Q 20/18
See application file for complete search history.

(56) References Cited

U.S. PATENT DOCUMENTS

| | | |
|---|---|---|
| 7,222,000 B2 | 5/2007 | Wang |
| 9,411,337 B1 | 8/2016 | Theobald |
| 9,535,421 B1 | 1/2017 | Canoso |
| 9,649,766 B2 | 5/2017 | Stubbs |
| 10,755,522 B1 | 8/2020 | Pechinko |
| 2007/0192910 A1 | 8/2007 | Vu |
| 2007/0198129 A1 | 8/2007 | Koselka |
| 2010/0145512 A1 | 6/2010 | Flessas |
| 2011/0098923 A1* | 4/2011 | Lee ........... G01C 15/00 701/532 |

(Continued)

FOREIGN PATENT DOCUMENTS

CN  101548300 A  9/2009

OTHER PUBLICATIONS

Office Action (Non-Final Rejection) dated Nov. 3, 2021 for U.S. Appl. No. 17/212,780 (pp. 1-19).

(Continued)

*Primary Examiner* — Jeffrey K Wong
(74) *Attorney, Agent, or Firm* — Armstrong Teasdale LLP

(57) ABSTRACT

A mobile kiosk management (MKM) system including a MKM server including a processor and a memory device storing instructions is described. The instructions, when executed by the processor, cause the processor to upload a plurality of applications to a mobile kiosk, identify a first task for the mobile kiosk to perform, and identify a first application for the mobile kiosk to execute to perform the first task. The instructions also cause the processor to cause the mobile kiosk to execute the first application to perform the first task, identify a second task for the mobile kiosk to perform at the venue, and identify a second application for the mobile kiosk to execute to perform the second task. The instructions further cause the processor to determine that the mobile kiosk has performed the first task and cause the mobile kiosk to execute the second application to perform the second task.

20 Claims, 12 Drawing Sheets

(56) References Cited

U.S. PATENT DOCUMENTS

| | | |
|---|---|---|
| 2015/0158182 A1 | 6/2015 | Farlow |
| 2015/0190927 A1 | 7/2015 | Sutherland |
| 2019/0049995 A1 | 2/2019 | Ferguson |
| 2019/0375102 A1 | 12/2019 | Wang |
| 2019/0377349 A1 | 12/2019 | Van Der Merwe |
| 2020/0050206 A1 | 2/2020 | Deyle |
| 2020/0290210 A1 | 9/2020 | Ha |
| 2021/0018912 A1 | 1/2021 | Dymesich |
| 2021/0046650 A1* | 2/2021 | Deyle ................. G05D 1/0214 |
| 2021/0081917 A1 | 3/2021 | Blackford |
| 2021/0304559 A1* | 9/2021 | Cupersmith .......... H04W 4/025 |
| 2021/0331315 A1 | 10/2021 | Park |
| 2021/0362335 A1 | 11/2021 | Kim |

OTHER PUBLICATIONS

Office Action (Final Rejection) dated Apr. 20, 2022 for U.S. Appl. No. 17/212,780 (pp. 1-19).
Office Action (Notice of Allowance and Fees Due (PTOL-85)) dated Aug. 17, 2022 for U.S. Appl. No. 17/212,780 (pp. 1-9).
Office Action (Non-Final Rejection) dated Dec. 8, 2022 for U.S. Appl. No. 17/212,617 (pp. 1-26).

* cited by examiner

| Applications 482 | | | | | +Add 492 |
|---|---|---|---|---|---|
| Name | Number of bots 484 | App Version 486 | Make Default App 488 | Actions 490 | |
| Advertisement App | 2 | 1.2 | | Edit 494 | 🗏 496 |
| Game Provider App | 1 | 4 | | Edit | 🗏 |
| Celebration App | 4 | 1.3 | | Edit | 🗏 |
| Drink Order App | 3 | 2 | | Edit | 🗏 |
| Game App | 4 | 3.5 | | Edit | 🗏 |
| Marketing App | 3 | 1.2 | | Edit | 🗏 |
| New App | 3 | 2 | | Edit | 🗏 |
| Rewards App | 2 | 3 | | Edit | 🗏 |
| Settings App | 5 | 1.3 | | Edit | 🗏 |
| « ‹ Pg: 1 of 9 › » Results/Pg: 1 ˅ 497 | | | | | |

FIG. 4D

SYSTEMS AND METHODS FOR MOBILE KIOSK REMOTE ADMINISTRATION IN ELECTRONIC GAMING

TECHNICAL FIELD

The field of disclosure relates generally to electronic gaming, and more specifically, to systems and methods for mobile kiosk remote administration in electronic gaming.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, a mobile kiosk management (MKM) system is described. The MKM system includes a plurality of mobile kiosks deployed within a venue including a plurality of gaming devices and a MKM server in communication with the plurality of mobile kiosks wherein the MKM server includes at least one processor and at least one memory device storing instructions. The instructions, when executed by the at least one processor, cause the at least one processor to upload a plurality of applications to at least one mobile kiosk of the plurality of mobile kiosks, identify a first task for the at least one mobile kiosk to perform at the venue, and identify a first application of the plurality of applications for the at least one mobile kiosk to execute to perform the first task. The instructions also cause the at least one processor to cause the at least one mobile kiosk to execute the first application to perform the first task, identify a second task for the at least one mobile kiosk to perform at the venue, and identify a second application of the plurality of applications for the at least one mobile kiosk to execute to perform the second task. The instructions further cause the at least one processor to determine that the at least one mobile kiosk has performed the first task and cause the at least one mobile kiosk to execute the second application to perform the second task.

In another aspect, at least one non-transitory computer-readable storage medium with instructions stored thereon is described. The instructions, when executed by at least one processor, cause the at least one processor to upload a plurality of applications to at least one mobile kiosk of a plurality of mobile kiosks at a venue, identify a first task for the at least one mobile kiosk to perform at the venue, and identify a first application of the plurality of applications for the at least one mobile kiosk to execute to perform the first task. The instructions also cause the at least one processor to cause the at least one mobile kiosk to execute the first application to perform the first task, identify a second task for the at least one mobile kiosk to perform at the venue, and identify a second application of the plurality of applications for the at least one mobile kiosk to execute to perform the second task. The instructions further cause the at least one processor to determine that the at least one mobile kiosk has performed the first task and cause the at least one mobile kiosk to execute the second application to perform the second task.

In yet another aspect, a method for mobile kiosk remote administration implemented by at least one processor in communication with at least one memory is described. The method includes uploading a plurality of applications to at least one mobile kiosk of a plurality of mobile kiosks at a venue, identifying a first task for the at least one mobile kiosk to perform at the venue, and identifying a first application of the plurality of applications for the at least one mobile kiosk to execute to perform the first task. The method also includes causing the at least one mobile kiosk to execute the first application to perform the first task, identifying a second task for the at least one mobile kiosk to perform at the venue, and identifying a second application of the plurality of applications for the at least one mobile kiosk to execute to perform the second task. The method further includes determining that the at least one mobile kiosk has performed the first task and causing the at least one mobile kiosk to execute the second application to perform the second task.

BRIEF DESCRIPTION OF THE DRAWINGS

FIG. 4D illustrates an example screenshot and/or interface for use with the MKM system shown in FIG. 4A.

DETAILED DESCRIPTION

Figure 1:
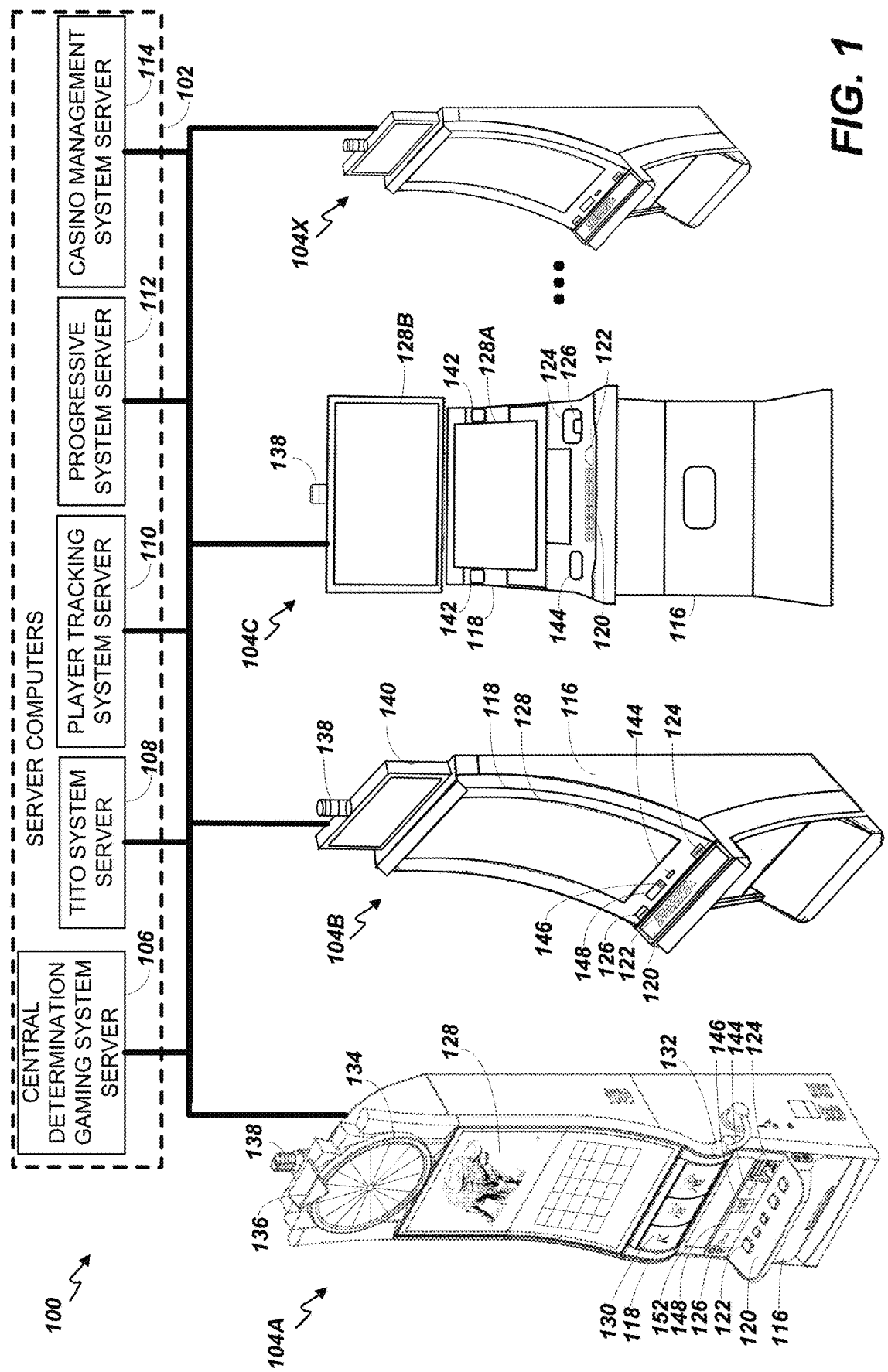
FIG. 1 is an exemplary diagram showing several EGMs networked with various gaming related servers.

Described herein are systems and methods for mobile kiosk remote administration in electronic gaming. For example, a fleet of robots (e.g., mobile kiosks) may be deployed to a venue including gaming devices (e.g., a casino). The robots may be configured to execute any of a plurality of applications (e.g., similar to the way a mobile/smart device and/or other computing devices execute different applications) to perform certain tasks. Which application of the plurality of applications any of the robots is executing at a particular time may be determined in a variety of ways (e.g., based upon user input, based upon a stored schedule, based upon a dynamic task queue, etc.).

In the example embodiment, a model view controller service (MVCS) structured application (app) is developed (e.g., by a software engineer). Each app includes a specific configuration file and a collection of assets (e.g., art, video, sound) used by the app. The apps are developed and tested results are packaged into a zip file. Apps are then distributed by an app distribution system. For example, the app distribution system pushes out new and/or updated app zip files to remote administration systems (e.g., in Cloud hosted environments and/or local property installed environments). In some embodiments, apps are manually installed on remote admin systems.

In the example embodiment, the remote admin systems receive and recognize the app zip files. A remote admin user (e.g., or the remote admin system automatically) may select zero robots or a number of robots in the fleet to deploy an app to. In some embodiments, certain apps may only function on certain robot bodies. Upon deployment, a robot platform receives the app zip file and stores it on the robot system. The robot unzips the app zip file and places its code, app config file, and/or other related assets into a designated folder on the robot system. At a scheduled and execution-safe time, the new app becomes available for use by the robot system.

In other words, a mobile kiosk management (MKM) system is described. In the example embodiment, the MKM system includes a plurality of mobile kiosks and a MKM server in communication with the plurality of mobile kiosks. The MKM server is configured to upload a plurality of applications to a plurality of mobile kiosks for storage thereon.

The MKM server then identifies a first task for the mobile kiosk to perform at the venue and identifies a first application of the plurality of applications for the mobile kiosk to execute to perform the first task. Upon identification of the task and application, the MKM server causes the at least one mobile kiosk to execute the first application to perform the first task. Tasks, as described herein, may include a kiosk task, a delivery task, a celebration task, a digital wallet task, a photography task, a drop box task, or a data collection and diagnostic task, as examples.

In some embodiments, the MKM server may identify a task for the mobile kiosk to perform based on a user input (e.g., at a graphical user interface of a device in communication with the MKM server). In some embodiments, the MKM server may identify a task for the mobile kiosk to perform based on a schedule stored in a memory of the MKM server. For example, a schedule may be automatically generated by the MKM server and/or configured by an administrator in order to schedule which tasks the mobile kiosks should perform and when (e.g., an advertisement task for a predetermined amount of time, then a photography task for a second predetermined amount of time).

In some embodiments, the MKM server may identify a task for the mobile kiosk to perform based on a dynamic task queue. For example, tasks may be dynamically identified by the MKM server based on messages sent to and/or detected by the MKM server. As an example, the MKM server may identify that a player at a gaming device has requested a drink. Accordingly, the MKM server may generate a drink delivery task and put that task in the queue such that when the drink delivery task reaches the top of the queue, a next available robot capable of performing the drink delivery task delivers the drink to the player. Additional and/or alternative tasks are described herein.

The queue may be managed by the MKM server such that the order of tasks in the queue is based on, as examples, times the tasks were requested, a device and/or player requesting the task, and a "weight" of the requested task (e.g., certain tasks may be assigned different priorities than other tasks, and may be weighted more heavily when the MKM server determines where to assign certain tasks in the queue). As another example, tasks associated with certain players may be assigned a higher weight (e.g., priority) when being added to the queue and/or determined to be assigned to a robot. For instance, players associated with player loyalty accounts of a higher level or status (e.g., platinum or gold vs silver or bronze) may be able to request tasks (e.g., drink delivery, assistance at a gaming device, kiosk services such as creation of restaurant reservations, etc.) that are assigned to be performed more quickly than other tasks.

In some embodiments, certain mobile kiosks may only be able to perform certain tasks. For example, some mobile kiosks may not include the hardware required to perform certain tasks (e.g., certain hardware may be required for a mobile kiosk to deliver a beverage). Accordingly, the MKM server, when determining whether or not to assign a task to a mobile kiosk, may also determine which robots are capable of performing that particular task. It should be appreciated that other factors are also considered by the MKM server when assigning tasks, such as which mobile kiosks are currently unassigned to a task and/or which mobile kiosks would be able to attend to and/or complete a new task most-quickly.

Continuing the example above, the MKM server then identifies a second task for the mobile kiosk to perform at the venue and identifies a second application of the plurality of applications for the mobile kiosk to execute to perform the second task. Before causing the mobile kiosk to perform the second task, the MKM server determines that the at least one mobile kiosk has performed the first task. Then, upon completion of the first task, the MKM server causes the mobile kiosk to execute the second application to perform the second task.

In the example embodiment, the MKM system is also configured to facilitate the installation of new and/or updated apps on the mobile kiosks (e.g., via the MKM server). For example, the MKM server may receive new application data for a new application from an application distribution system and cause the new application data to be uploaded on to a mobile kiosk. Further, the MKM server may receive updated application data for the first application from an application distribution system and cause the updated application data to be uploaded on to the at least one mobile kiosk.

In some embodiments, the MKM server may identify a mobile kiosk body type associated with a mobile kiosk and determine that the mobile kiosk body type matches a mobile kiosk body type associated with new/updated application data (e.g., indicating that the mobile kiosk body type can execute a task associated with the new application). Then, the MKM server may cause the new application data to be uploaded on to the mobile kiosk based upon determining that the mobile kiosk body type matches a mobile kiosk body type in the new application data.

In some embodiments, the MKM server may identify a group task for plurality of mobile kiosks to perform and cause the group of the plurality of mobile kiosks to perform the group task simultaneously (e.g., a celebration task, an evacuation task, etc.).

Certain technical problems arise when implementing an MKM system for mobile kiosk remote administration in electronic gaming environments. For example, known mobile kiosk systems include limitations in the flexibility of mobile kiosks (e.g., certain known mobile kiosks are limited to performing one task based on hardware limitations). Further, when implementing flexible mobile kiosks that can be configured and re-configured with different apps, certain technical challenges arise including: i) assigning tasks only to mobile kiosks capable of performing those tasks; ii) efficiently assigning tasks to mobile kiosks (e.g., previously not a problem because known mobile kiosks are limited in the number of tasks they can perform, so certain tasks previously needed to be assigned to specific robots—with the flexibility of the mobile kiosks described herein, tasks can be assigned to any of a plurality of mobile kiosks and assigning tasks needs to be more efficiently managed); and iii) operating the mobile kiosks in an energy-efficient manner to give the mobile kiosks longer active time before needing to be re-charged (e.g., storing data regarding a plurality of apps on a mobile kiosk can drain a battery of the mobile kiosk).

Battery usage is particularly important for the mobile kiosks described herein because larger batteries require more charging time, smaller batteries have a shorter operating time before needing to be charged, and over-using a battery can generate excess heat which may damage the battery and/or other mobile kiosk components.

Further, certain networking and/or machine learning challenges arise when implementing, as an example, a fleet of mobile kiosks in a casino environment. Oftentimes casino properties limit communications into and/or out of the property and do not allow wide open internet communications. Accordingly, when performing certain tasks, processing must be performed on the mobile kiosk itself without utilization of an outside library. As one example, when performing speech-to-text tasks, a mobile kiosk in a casino environment may not be able to access an outside library in order to perform speech-to-text. Accordingly, pre-trained datasets and/or machine learning libraries are utilized by the mobile kiosks described herein (e.g., and require computing resources on the mobile kiosks).

Other examples of machine learning and/or computer processing intensive functionalities performed by mobile kiosks described herein include navigation functions (e.g., the mobile kiosk navigating a casino floor), natural language processing (e.g., to interpret what a customer is saying), text to speech (e.g., to respond to a customer), and object/obstacle detection. For example, machine learning may be utilized for the mobile kiosks to recognize hazardous objects that often appear in casinos such as escalators (e.g., certain sensors may not detect an escalator), elevators (e.g., entry into an elevator may cause a mobile kiosk to go to a different, unintended floor), groups of people, and/or objects on the floor of a casino (e.g., purses). Machine learning may also be utilized to identify other objects such as a charging station and/or a face of a customer (e.g., a mobile kiosk may learn to identify which customer is talking to the mobile kiosk, via audio (e.g., speech) or visual (e.g., mouth movement) and cause eyes of a face displayed on the mobile kiosk to "look" at the speaking customer.)

Accordingly, the systems and methods described herein provide technical solutions to the described technical problems. For example, the mobile kiosks described herein are flexible and capable of operating a plurality of apps to perform a plurality of tasks. When implementing the flexible mobile kiosks, certain technical solutions are provided including: i) assigning tasks and pushing apps only to mobile kiosks capable of performing those tasks and operating the apps; ii) efficiently assigning tasks to mobile kiosks (e.g., time efficient and energy efficient); and iii) storing minimal data on the mobile kiosks in order to operate the mobile kiosks in an energy-efficient manner to give the mobile kiosks longer battery life before needing to be re-charged.

For example, the mobile kiosks described herein are designed with a minimalist approach with respect to the mobile kiosk bodies (e.g., software for the mobile kiosk is stored in a flexible manner on the mobile kiosk and processing that does not need to be run on the mobile kiosk may be executed by an external device (e.g., inputs for a certain app may be determined by a different server and then communicated to a mobile kiosk, instead of all processing being performed onboard the mobile kiosk)). Accordingly, computing resources are saved for other improvements implemented onboard the mobile kiosks (e.g., the machine learning and other examples described above, video, 3D camera sensing, object detection, speech to text, natural language processing, text to speech, and/or other machine learning, as examples).

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
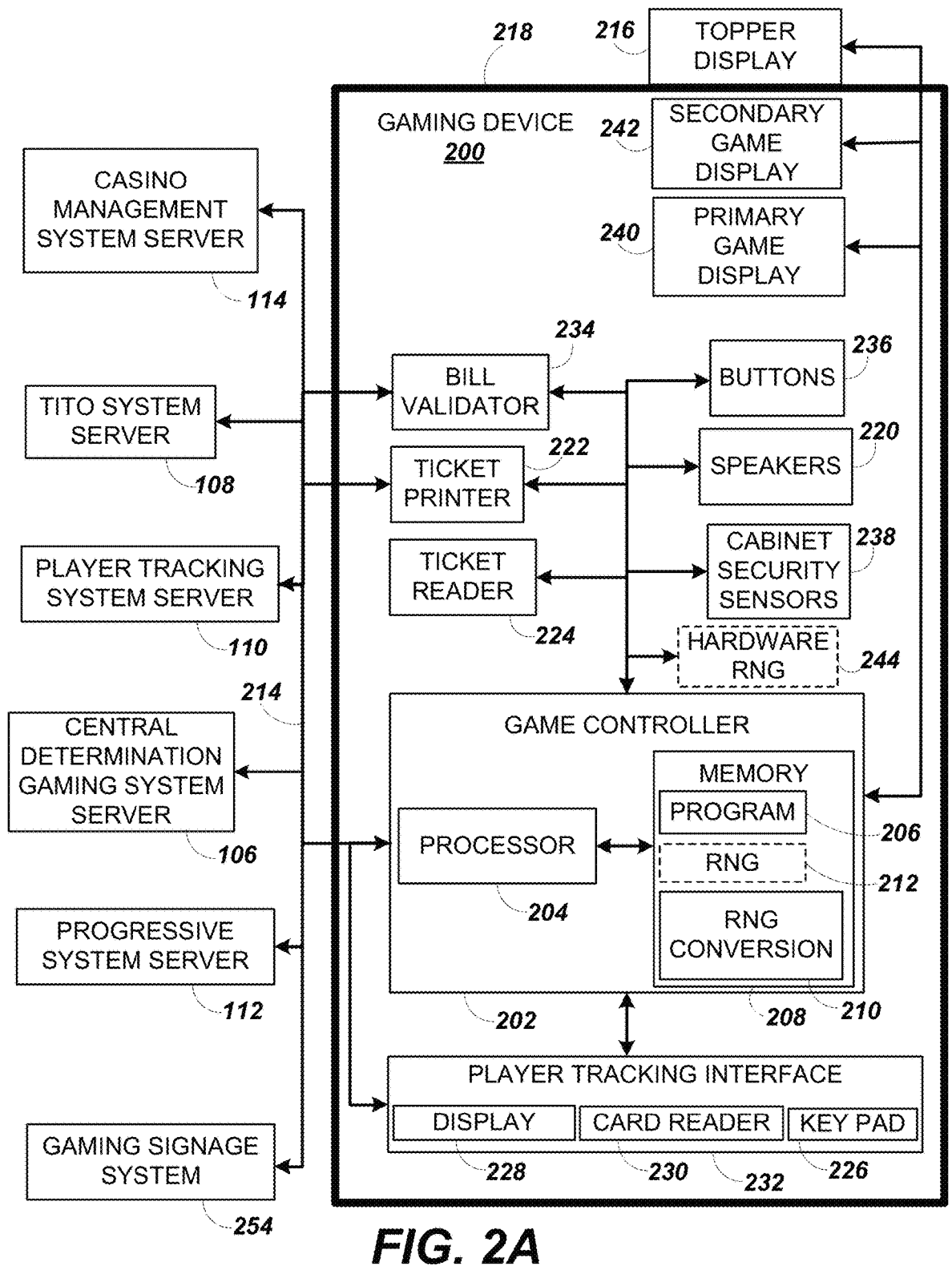
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
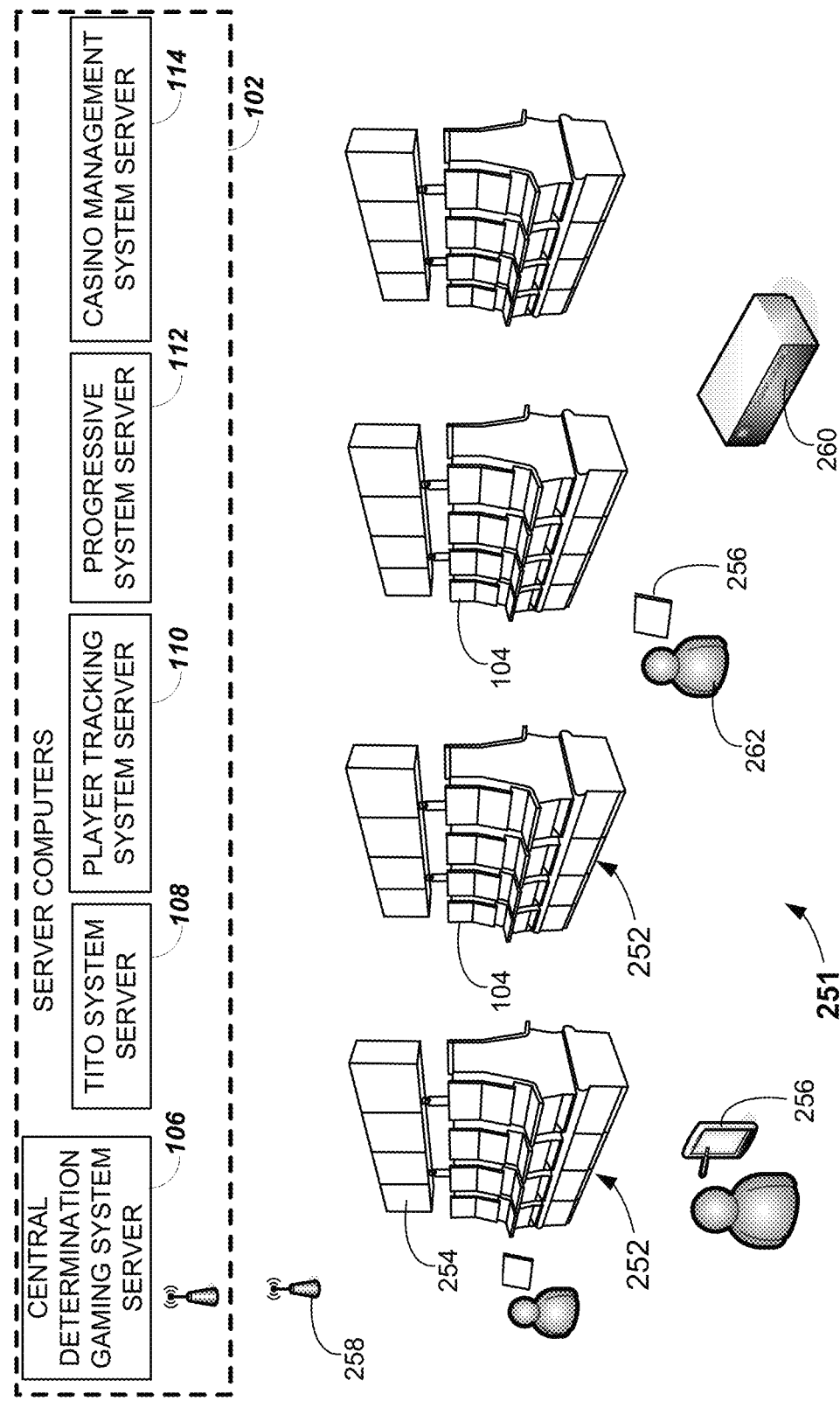
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
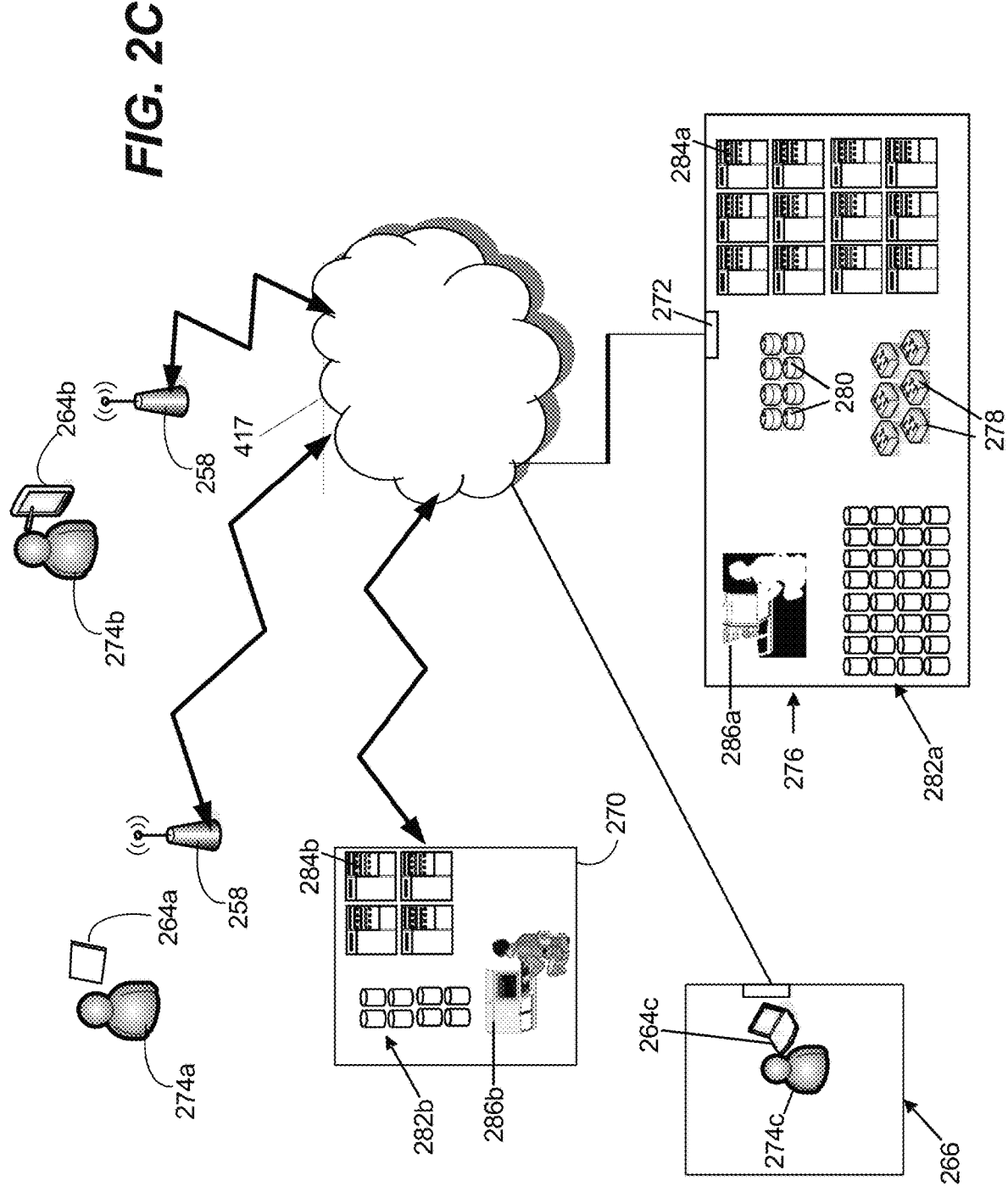
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264a, 264b and 264c are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282a, servers 284a and one or more workstations 286a. The servers 284a may, for example, be configured to provide access to a library of games for online game play. In some examples, code for executing at least some of the games may initially be stored on one or more of the storage devices 282a. The code may be subsequently loaded onto a server 284a after selection by a player via an EUD and communication of that selection from the EUD via the networks 417. The server 284a onto which code for the selected game has been loaded may provide the game according to selections made by a player and indicated via the player's EUD. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284b, storage devices 282b, and one or more workstations 286b. According to this example, the financial institution data center 270 is configured to maintain financial accounts, such as checking accounts, savings accounts, loan accounts, etc. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost. According to some such implementations, one or more of the servers 284a may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
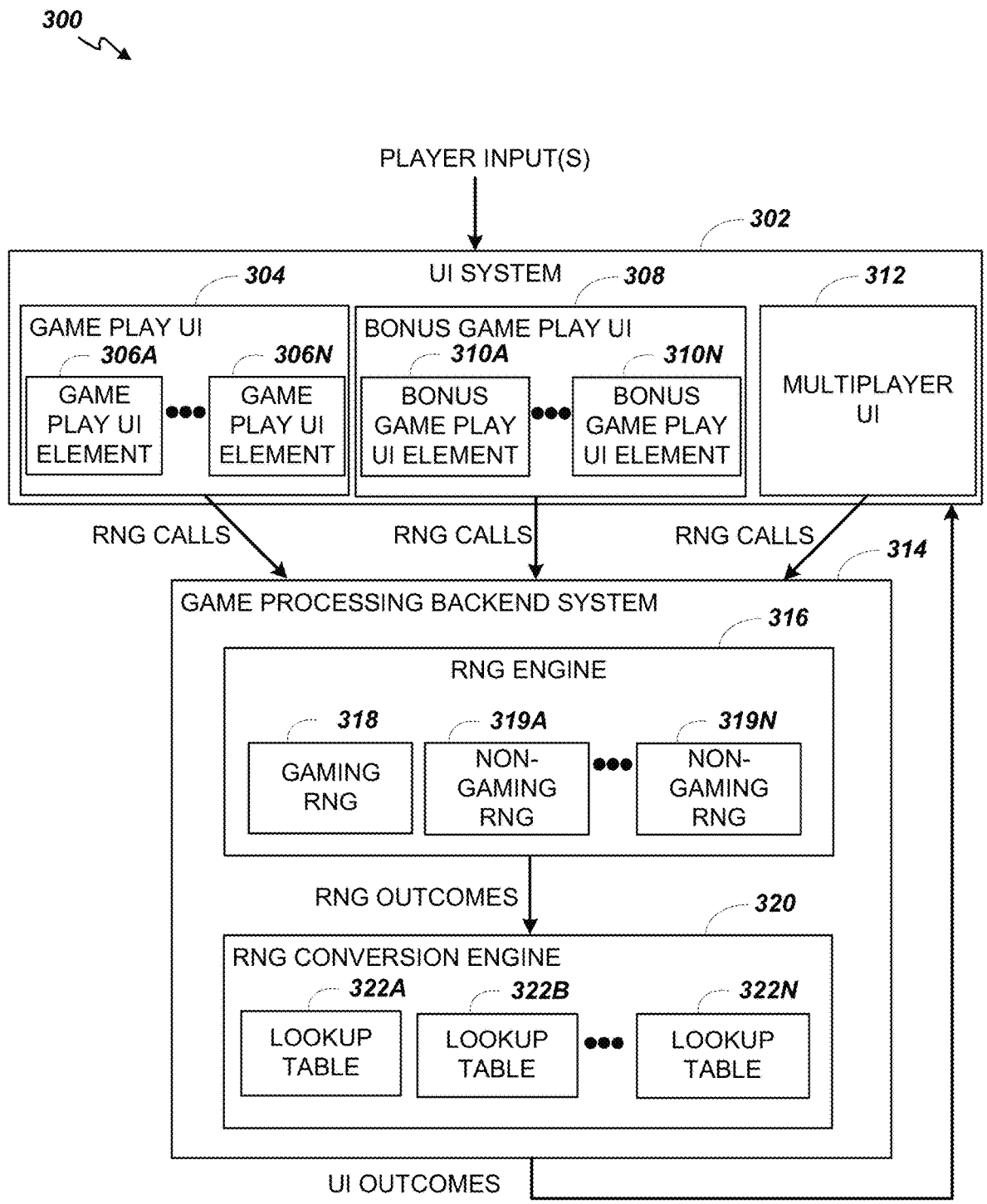
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4A:
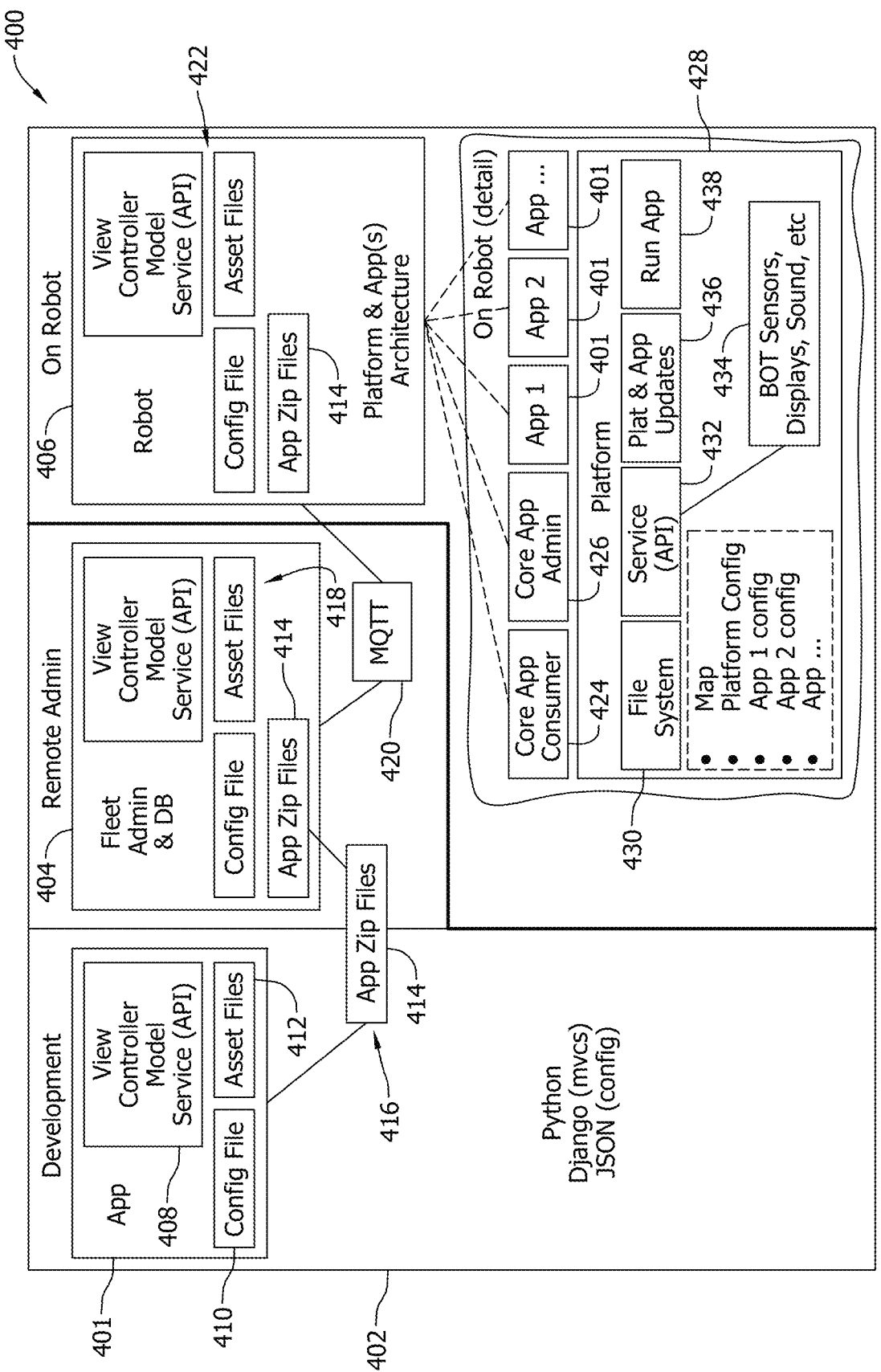
FIG. 4A illustrates an example mobile kiosk management (MKM) system, in accordance with the present disclosure and, in some embodiments, for use in any of the systems, architectures, and/or environments shown in FIGS. 1-3.

FIG. 4A illustrates an example MKM system 400, in accordance with the present disclosure and, in some embodiments, for use in any of the systems, architectures, and/or environments shown in FIGS. 1-3. System 400 illustrates how an app 401 moves from a development environment 402 to a remote admin system 404 and finally to a robot 406 (e.g., mobile kiosk) in a fleet of robots.

As shown in FIG. 4A, environment 402 includes a model view controller service 408 (MVCS), config files 410, and asset files 412. In the example embodiment, an MVCS 408 structured app is developed by a software engineer. Each app 401 has a configuration file 410 and a collection of asset files 412 (e.g., art, video, sound) used by app 401.

In the example embodiment, each app 401 is built in a local development environment using, as examples, Python and Django (MVCS library). Config files 410 are JavaScript Object Notation (JSON) files, for example. Asset files 412 are files needed for an app 401 to run properly, such as: images, videos, audio, and ML (machine learning) trained files, as examples.

The developed and tested results for app 401 are packaged into a zip file 414 and transmitted to an app distribution system 416. Zip file 414 contains all the app specifics mentioned above (e.g., MVCS 408 code, config file 410, and asset files 412), and can be uploaded to zero or more remote admin systems 404 (e.g., for use in a property/venue that has one or more robots).

In the example embodiment, each app 401 includes a header including standard fields used by all apps (e.g., and that should be treated as constants/read-only by all external systems and people). The header may include a name (e.g., a text string—no app 401 should have the same name), a description (e.g., a long text string), an app identifier (ID) (e.g., unique to each app 401—no app 401 should have the same ID number), such as a manually issued twelve digit unique ID, a vendor name, a vendor ID (e.g., a unique number assigned by an app authority), a vendor app version (e.g., a formal version number provided by the original creator of app 401—may include a version number and/or sub-version number, along with app 401 release date and/or time), an oldest platform version (e.g., an oldest platform version that app 401 can run on at the time of the app version release), a newest platform version (e.g., a newest platform version that app 401 can run on at the time of the app version release), and an app type (e.g., admin or consumer).

Further, each app 401 includes a body including app specific field/values that are unique just to each app 401. Some body data can only be readable by remote admin system 404 (e.g., and users thereof) and some can be configurable by remote admin system 404 (e.g., and users thereof). The body may also include an app configured version (e.g., an incremental version number created by an instance of remote admin system 404, when a remote admin user (e.g., at a casino property) makes some editable configuration changes to app 401 that will be unique to their local deployment of app 401 to the robots they use at the property). Remote admin system 404 increments the version number on each save of a local customized configuration for app 401 and includes date and time values for when app 401 was saved. Different languages may be supported by app 401, including American English, British English, Americas Spanish, Spain Spanish, Quebec French, France French, German, and Italian.

Other examples of customizable options for an app may include a body (e.g., upper body), a persona (e.g., surfer dude), a gender (e.g., male), a face, a line color, an eye iris color, a lip color, language (e.g., as noted above), and/or messages (e.g., "Welcome to our hotel. How can I help you?" or "The casino entrance is on the right side of the hotel check in desks."). As one specific example, a partial code example is provided below: "name": "hotel welcome", "description": "This App is used for robots stationed in hotel lobby areas and used to welcome guests and offer them information.", "app id": 100000000001.210102.093002, "vendor name": "XYZ" "vendor id": "1000001", "vendor app version": "1.0.220101.133700", "oldest platform version": "1.0", "newest platform version": "3.5", "app type": "consumer", "configured version": "2.220106.101255", "persona": "surfer dude", "language": "American English", "eye iris color": 00FF00, "welcome": "Yo dude, how can I be of service."

App distribution system 416 pushes out new and/or updated app zip files 414 to varying remote admin systems 404 (e.g., in Cloud hosted and/or local property installed environments). In some embodiments, apps 401 are manually installed on systems 404. In the example embodiment, system 404 includes a fleet admin database 418 (e.g., including zip file 414, MVCS 408 code, config file 410, and asset files 412) and a message queueing telemetry transport (MQTT) 420.

Upon transmission from system 416 to remote admin system 404, system 404 recognizes zip file 414. A user (e.g., technician, administrator, etc. at a user interface associated with system 404) can select a number of robots 406 of fleet to deploy app 401 to. MQTT 420 is configured to transmit zip file 414 the appropriate robots 406. In some embodiments, a number of robots 406 the app 401 is pushed to is automatically determined by system 404. In some embodiments, apps 401 can only function on certain robot 406 bodies.

In the example embodiment, robot 406 receives zip file 414 and stores it on robot 406. Robot 406 then unzips zip file 414 and places zip file code, config file 410, and related asset files 412 into a designated folder 422 on robot 406. At a scheduled and execution-safe time (e.g., after a current app has completed a task and a different app 401 has stopped running, as determined by run app component 438), app 401 becomes available for use by robot 406. As shown in FIG. 4A, robot 406 includes a plurality of apps 401, a core app consumer 424, a core app admin 426, and a platform 428. In the example embodiment, platform 428 includes a file system 430 (e.g., storing a map (e.g., of a casino floor), a platform config, config files for the plurality of apps 401, platform-specific assets (e.g., images, sounds, videos, ML data sets, etc.), and app-specific assets (e.g., images, sounds, videos, ML data sets, etc.)), a service application programming interface (API) 432 (e.g., an MQTT server used to talk to system 404 and store backup of some key files/data (e.g., maps, robot config files, etc.), ROS2 (robot operating system 2) and related edge device 434, and a mobile app for use with edge devices 434 (e.g., components) of robot 406, platform and app updates 436, and a run app component 438 to run one or more apps 401.

In other words, remote admin system 404 manages a property's fleet of robots 406, integrates into other systems, and configures apps 401 used on robots 406. In some embodiments, system 404 is installed on local hardware inside a casino property. Some properties (e.g., casinos) may not want remote admin system 404 installed externally to their facility (e.g., because they may also not want data being transmitted externally from their facility to another location). Accordingly, hardware, network (static IP addresses), and security access requirements are defined to ensure successful operation of system 404 at a client property.

In some embodiments, system 404 may be installed at other properties (e.g., a restaurant, movie theatre, bingo hall, retail store, mall, car dealership, etc.). In some embodiments, system 404 is hosted in the cloud (e.g., by provider servers and/or a vendor (e.g., Azure, AWS, etc.). In some embodiments, system 404 can be installed and accessed at a plurality of locations.

At system 404, an administrator is provided access to control different aspects of robots 406 (e.g., at a property) via one or more graphical user interfaces (GUIs), as explained herein (e.g., as different views). For instance, a front-end (e.g., React) and a backend framework (e.g., Django) are utilized to provide GUIs to facilitate control of a fleet of robots 406. System 404 may include a database to help store and secure all information regarding the users of system 404 as well as any data that goes to and from robot 406.

Figure 4B:
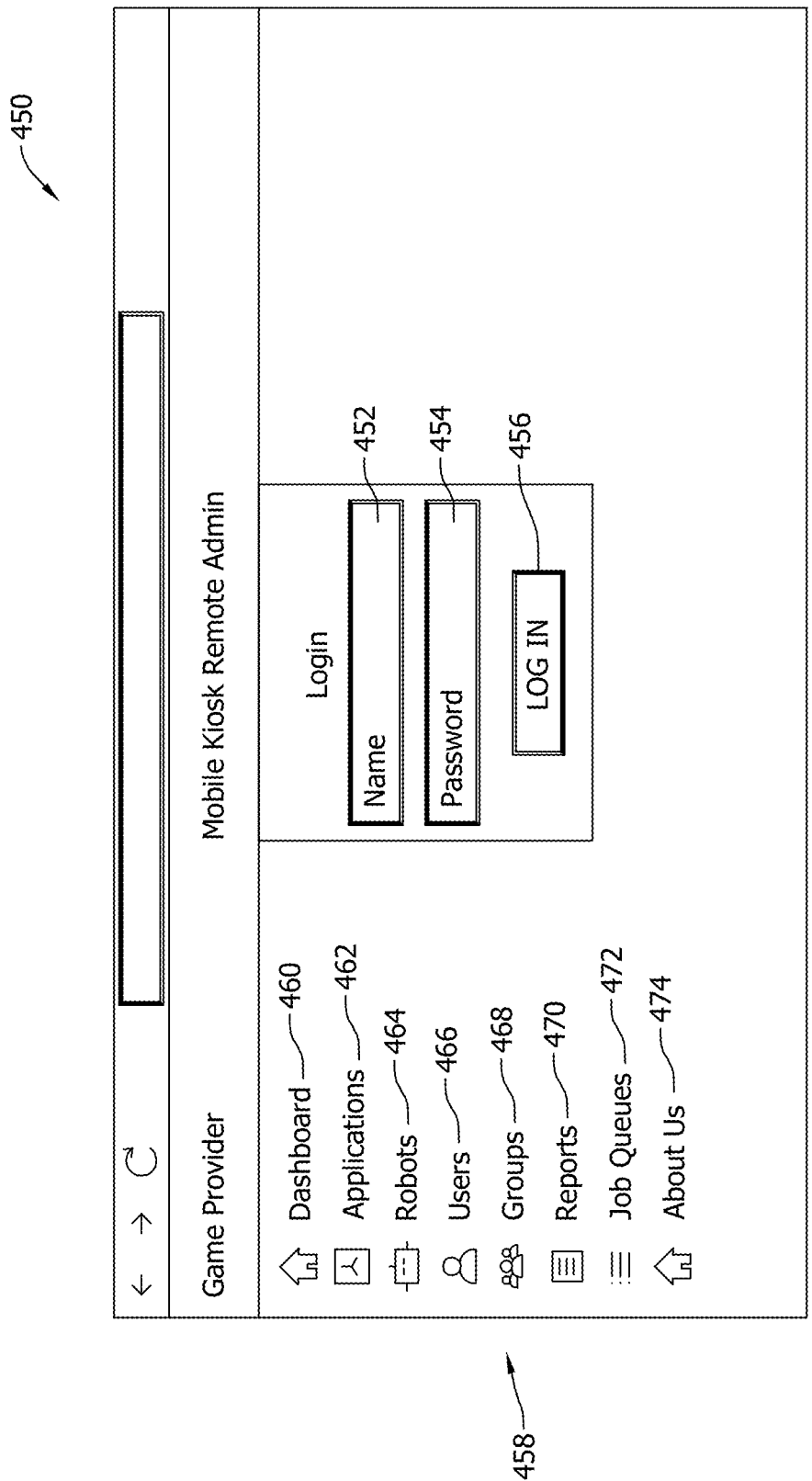
FIG. 4B illustrates an example screenshot and/or interface for use with the MKM system shown in FIG. 4A.

FIG. 4B illustrates an example interface 450 for use with system 400. As shown in FIG. 4B, interface 450 includes a username input field 452 (e.g., for input of a username), a password field 454 (e.g., for input of a password), a log in selector 456 (e.g., to select to log in), and a list of selectable tabs 458 selectable to navigate to different pages. For example, selection of a dashboard tab 460 may cause navigation to a dashboard GUI, selection of an applications tab 462 may cause navigation to an applications GUI, selection of a robots tab 464 may cause navigation to a robots GUI, selection of a users tab 466 may cause navigation to a users GUI, selection of a groups tab 468 may cause navigation to a groups GUI, selection of a reports tab 470 may cause navigation to a reports GUI, selection of a job queues tab 472 may cause navigation to a job queues GUI, and selection of an about us tab 474 may cause navigation to an about us GUI (e.g., displaying information about system 404 and/or robot 406 provider).

Figure 4C:
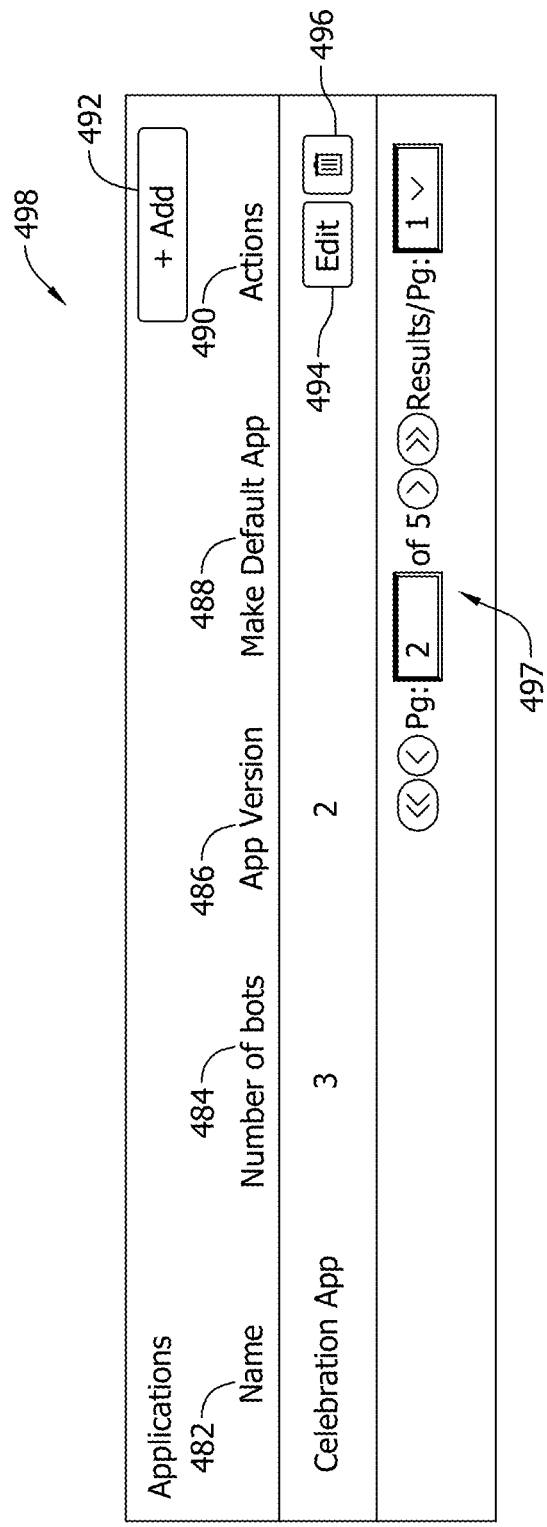
FIG. 4C illustrates another example screenshot and/or interface for use with the MKM system shown in FIG. 4A.

FIG. 4C illustrates another example interface 480 associated with applications tab 462, shown in FIG. 4B. As shown in FIG. 4C, interface 480 includes a name column 482, a number of bots column 484, an app version column 486, a make default app column 488, and an actions column 490. Further, an add app selector 492 is provided, as well as an edit selector 494 and a delete selector 496. Navigation selectors 497 are also provided that allow for navigation across other example interfaces 480 (e.g., with display of different apps 401 and their corresponding information thereon).

Column 482 includes a name of an app at system 404 that is available for deployment to one or more robots 406 (e.g., Celebration App). Column 484 includes a number of robots 406 upon which the app is installed (e.g., three robots). Column 486 includes a version of the app (e.g., version 2). Column 488 includes an option to make the app a default app (e.g., to be initiated upon reboot of robot 406).

Further, selection of selector 492 causes navigation to a GUI that allows for an app 401 to be added to interface 480. For example, upon selection of selector 492 a list of apps available to be downloaded to system 404 may be provided. An administrator may then select one or more apps 401 for downloading to system 404. Then, upon downloading one or more apps 401 to system 404, the one or more apps 401 may be deployed to one or more robots 406 in a fleet. Also, upon download, the one or more apps 401 downloaded/added will be displayed in a new row of interface 480 with the appropriate details corresponding in columns 482-488.

Upon selection of edit selector 494, an interface may be displayed that allows an administrator to edit a respective app 401 corresponding to selector 494. For example, an administrator may be able to edit app 401 itself and/or which robots 406 app 401 is deployed to. Selection of selector 496 causes a respective app 401 to be deleted/removed from system 404.

FIG. 4D illustrates another example interface 498 associated with applications tab 462, shown in FIG. 4B. As shown in FIG. 4D, information for a plurality of apps 401 are shown on interface 498 including name column 482, number of bots column 484, app version column 486, make default app column 488, and actions column 490. Further, add app selectors 492, edit selectors 494, delete selectors 496, and navigation selectors 497 are shown.

In some embodiments, a dashboard (e.g., home page—displayed in response to tab 460) is provided that includes summary statuses of robot 406 fleet on the property (e.g., and/or perhaps across multiple properties if an administrator manages multiple physical property locations and wants to see status across them all). An app list view may also be provided that includes display areas and/or selectable options to view a number of robots 406 each app 401 is deployed on, a version of each app 401, an upload new app selector (e.g., system 404 can have zero or more apps 401), a remove app(s) selector (e.g., to remove apps from system 404), and an app selector (e.g., to select an app to read/update/delete). In some embodiments, a create, read, update, delete (CRUD) view is provided that allows an administrator to read a selected app's JSON config file (e.g., stored in zip file 414) and displays a hierarchy of field names and values from the config file on the screen/view.

Based on an administrator's permissions, an administrator may be able to read values, update values, delete values, save updated field/values back to the app JSON config file and recreate zip file 414 (e.g., in some embodiments. the updates may not be deployed on any robots 406. The updates may just change a stored copy of app 401 on a specific system 404). In some embodiments, system 404 logs changes (e.g., date/time of saved changes, app name, version being changed, field/values changed, user name who made changes) made on the app JSON config file (e.g., 410).

In some embodiments, an administrator may control deployment of one or more apps 401 to different robots 406 in a fleet from an interface. For example, an administrator may select one or more robots 406 (e.g., that are registered in system 404) and deploy app 401 to one or more robots 406. In some embodiments, an administrator may create and/or select a picklist (e.g., order) that gives a priority to installing the app 401. For example, an administrator may select to install app 401 when i) robot 406 is not driving and is not in use by a consumer, ii) robot 406 is not driving and is in use by a consumer, iii) robot 406 is charging and not in use by a consumer, iv) robot 406 is charging and is in use by consumer, v) robot 406 is on a next robot reboot, and/or vi) robot 406 is driving or in use by a consumer. However, installing app when robot 406 is driving or in use by a consumer may be harmful, as robot 406 may be driving based on a current app 401 running, and a new app 401 may be an updated version of current running app 401, and the install/update will kill the current app 401 that is running, which will stop robot 406 while driving and prevent robot 406 from continuing it's objective (e.g., and a current robot object/task could be lost before being completed (and can not be completed unless manually reassigned to perform that specific objective, even if robot 406 is at a different phase of that objective (e.g., pick up drink, drive to drink delivery destination, open secure door to provide drink to consumer, return to prior routine or base)).

In some embodiments, a read only field may be provided on the interface that shows if app 401 is a robot admin app or a robot consumer app. For example, certain apps may be consumer apps accessible by a consumer (e.g., a request for drink delivery) while other apps are admin apps (e.g., 426) that are only accessible by an admin (e.g., to check status, wellness, health, to troubleshoot different components/parts of robot 406). In some embodiments, certain aspects of admin apps may automatically be reported to system 404 via MQTT 420 (e.g., check status, wellness, health). Upon receipt of certain data that satisfies (e.g., exceeds) a threshold, system 404 may generate and transmit an alert to one or more user devices (e.g., mobile devices) to indicate a robot status associated with the exceeded threshold (e.g., overheating, part needs replacement, etc.).

A selectable checkbox may be provided to select app 401 as the default app robot 406 should run upon reboot. Another selectable checkbox may be provided to select to run app on robot 406 when installation of app 401 complete.

In some embodiments, deployment of zip file 414 to a plurality of robots 406 can happen if they are connected to a same network. Deployment may be different than installment. For example, installment may include i) unzipping zip file 414, ii) verifying a checksum on zip file 414 as initial validation that what was uploaded to robot 406 is not corrupted, iii) removing any prior version of app 401 (e.g., all app files, and update platform config file to remove old version of app 401), iv) copying/installing the unzipped files into their new locations in the robot file system, and v) updating robot platform config file (e.g., at file system 430) to let robot 406 know this new app version is available for use. Upon install/deployment, an administrator may exit an app CRUD view and return to app list view.

In some embodiments, a robot list view may be provided (e.g., in response to selection of tab 464) that includes a status for each robot 406 such as i) charging unused, ii) charging in use, iii) charging offline, iv) standing unused, v) standing in use, vi) driving, and/or vii) offline.

In some embodiments, a robot CRUD view may be provided that includes certain display areas including i) robot name, ii) robot IP address, iii) robot status (e.g., if charging, then also show: estimate time (hours/minutes) to complete charge), iv) battery (e.g., volts reading and estimated battery power remaining in time such as hours/minutes, and v) apps installed (e.g., listing of apps installed, admin apps list, flag which admin app is set as default, app version, consumer apps list, flag which consumer app is set as default, platform, date/time installed, and/or name of system 404 user who installed current platform version.

In some embodiments, a user (e.g., administrator) CRUD view may be provided (e.g., in response to selection of tab 466) that includes first name, middle name, last name, role, access permission groups (e.g., lists each access permission group this user is in), email address (e.g., with basic email validation—in some embodiments, email may be used to send alerts regarding system 404 and/or robot 406), and cell phone number (e.g., to send text alerts). In some embodiments, a user list view may be provided.

In some embodiments, an access control group CRUD view is provided (e.g., in response to selection of tab 468) that includes a table view listing each major functional section of system 404 and checkbox options for [x] Create (e.g., user can create a new record of this type), [x] Read (e.g., user can read the data in this section), [x] Update (e.g., user can make changes to the data and save it in this section), and/or [x] Delete (e.g., user can delete record of this type). In some embodiments, an access control group list view may be provided.

In some embodiments, a job queue list view is provided (e.g., in response to selection of tab 472) that includes a list of MQTT 420 queues (e.g., a dynamic task queue, as described herein, and managed by MQTT 420). In some embodiments, a job queue CRUD view is provided that includes an MQTT 420 view for a specific queue.

In some embodiments, an API CRUD view is provided that includes an API name, an API description, a status of API connection, and/or a manual test API connection selector (e.g., to ping a remote system to get verified response of availability). In some embodiments, an API list view may be provided.

In some embodiments, a remote system management list view is provided that includes a selector to upgrade system 404 (e.g., and a list of different topics to configure or read about remote system installation). In some embodiments, a remote system management CRUD view is provided.

In some embodiments, an alert types list view is provided including a listing of alert types (e.g., a user can select an alert type on the list view to edit on the CRUD view). Accordingly, in some embodiments, an alert type CRUD view is provided including an alert name, an alert description, a number of times this alert has occurred, and a return to alert type list view selector.

In some embodiments, an alert events list view may be provided including a listing of actual alert events (e.g., a user can select an actual alert event to see details on the CRUD view). Accordingly, in some embodiments, an alert event CRUD view is provided that includes an alert name, an alert description, date/time of alert, source that generated alert (e.g., a specific robot name/id/ip, the remote admin system and/or sub-system name (e.g., API xyz)), status (e.g., active, resolved), solution (e.g., a text area for user to type optional notes on how alert was resolved), a save selector, and/or a close selector to return to the alert event list view.

In some embodiments, a logs list view is provided that includes a listing of different log types (e.g., logs by day) with robot logs including search/read across all robots, search/read for one specific robot, search/read for specific log event across one or more robots, and/or search within a specified date/time start and end range. In some embodiments, remote admin logs are provided. In some embodiments, a logs CRUD view is provided.

In some embodiments, a help view is provided that is searchable, navigable, and/or includes content pages about how to install, use, configure, and/or update system 404 and/or robot 406.

In some embodiments, additional views may be provided including a reports list view and/or a reports CRUD view (e.g., in response to selection of tab 470).

In the example embodiment, system 404 is integrated with MQTT 420 (e.g., to upload files to robots 406, to read status information from robots 406, to change platform configuration files on robots 406), a tracking server (e.g., server 110) that manages gaming devices and/or customer loyalty cards/accounts/winnings/status, a mobile app used at a location (e.g., a casino), and/or a publish and subscribe communication system for large amounts of data (e.g., live video streams, high-volume sensor data).

Certain additional embodiments include multilingual system 404 (e.g., ability to change languages), responsive system 404 (e.g., to modify interfaces to fit screens of any size, including mobile devices of small screen size—and/or a "dark mode" option for a darker background), secure system 404 embodiments (e.g., integration for single sign on and/or authentication validation across different components of system 404 and components in communication with system 404).

Figure 5:
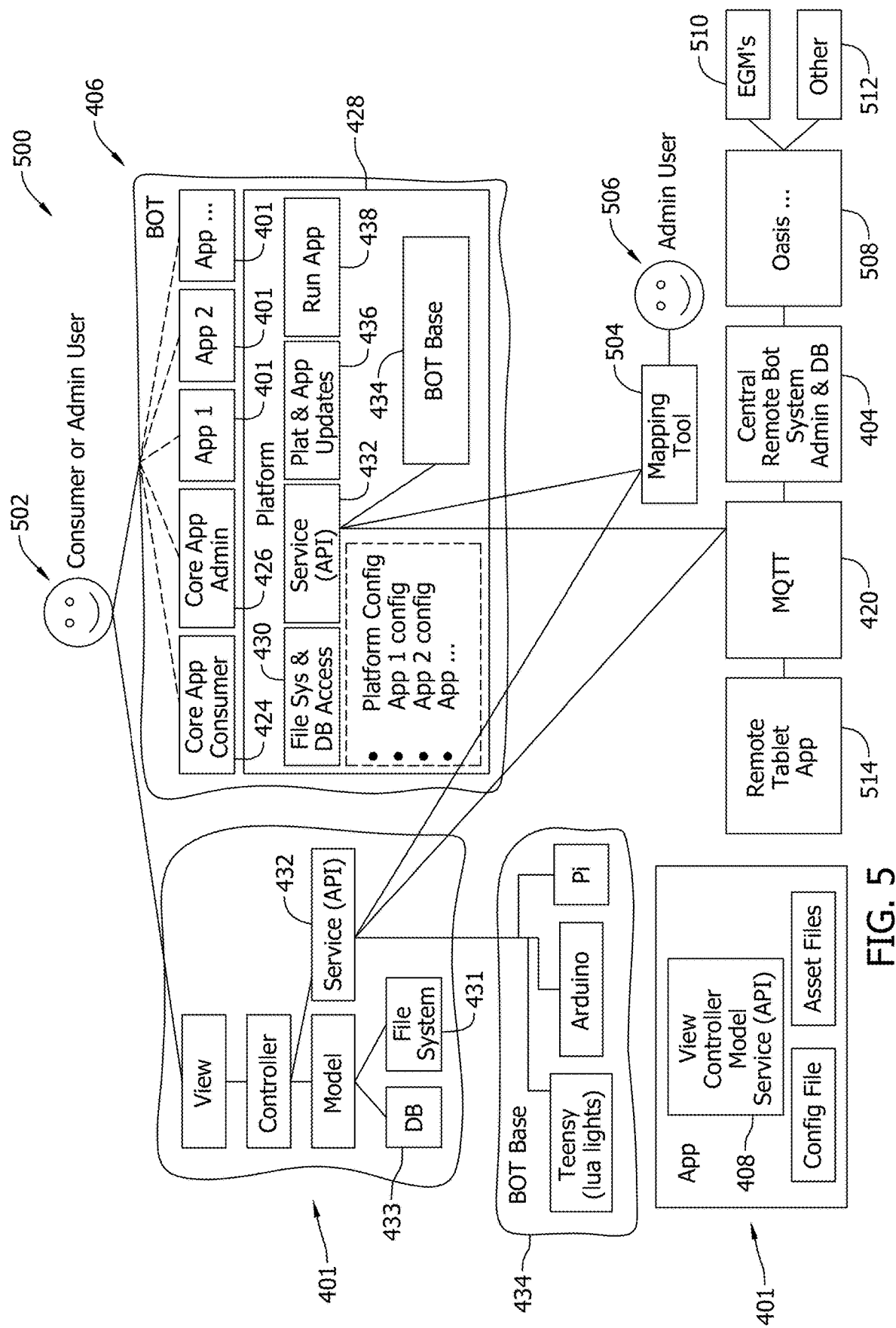
FIG. 5 illustrates another embodiment of the MKM system shown in FIG. 4A.

FIG. 5 illustrates another example MKM system 500, furthering the example shown in FIG. 4A. In other words, system 500 illustrates another view of how apps 401 follow MVCS 408 framework and are deployed to robots 406 in a fleet. System 500 follows the same MVCS 408 framework to interact with app 401 (e.g., an active app). More than one app 401 can be installed on robot 406 at the same time. Service API 432 tier of robot 406 communicates with a robot operating system (e.g., ROS2) system (e.g., run on an edge device 434), external mapping tool 504, other edge devices 434 of robot 406 and with external in/out-bound API's calls such as message queueing telemetry transport (MQTT) 420.

In the example embodiment, system 500 includes a user device 502 (e.g., or user) in communication with robot 406 to control certain aspects of robot 406, as described herein (e.g., and/or interact with the robot in accordance with an app), and a second user device 506 associated with tool 504. Other components in communication with robot 406 include a remote device app 514, a player tracking server 508 (e.g., server 110), electronic gaming machines 510 (e.g., devices 104A-X), and other electronic gaming devices and or components 512 (e.g., as shown in FIGS. 1-3).

Figure 6:
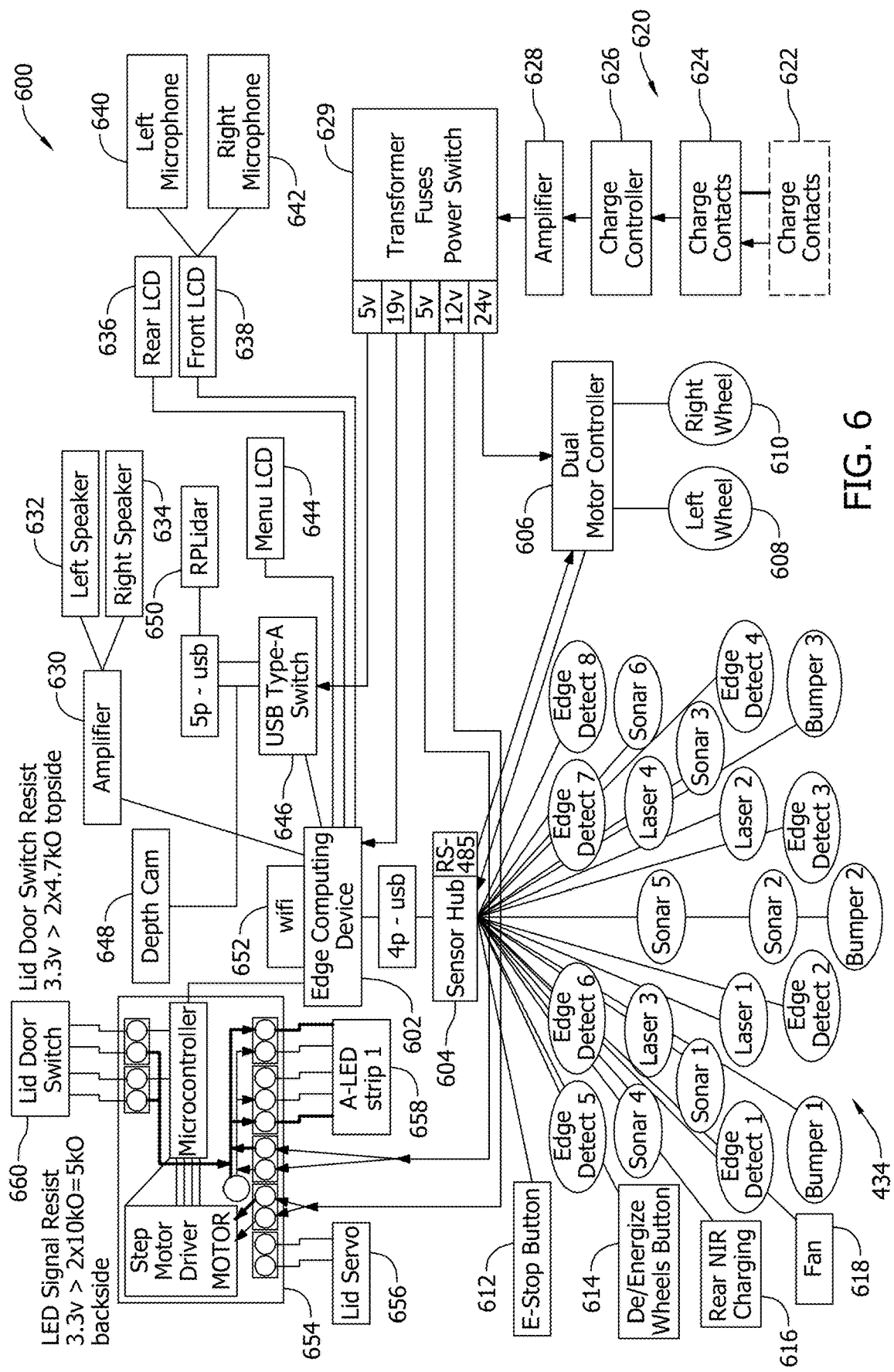
FIG. 6 illustrates an example mobile kiosk architecture, for use in the MKM systems shown in FIGS. 4A and 5.

FIG. 6 illustrates an example mobile kiosk architecture 600, for use in systems 400, 500, as shown in FIGS. 4A and 5 and to implement various robot functionalities described herein.

In the example shown in FIG. 6, architecture 600 includes a robotics module 602 (e.g., an edge computing device, next unit of computing (NUC), Nvidia Orin AGX, etc. operating on an Ubuntu operating system, for example). Module 602 sends drive commands (e.g., via a 4 prong—USB) to a sensor hub 604 (e.g., RS-485 via a TeleTYpewriter (TTY) protocol). Hub 604 converts the signals from module 602 (e.g., to RS-485 redundant protocol) and sends the converted signals to a motor controller 606 (e.g., a dual motor controller and/or Raspberry Pi, such as a Raspberry Pi Zero W). Controller 606 then controls wheels 608, 610 of robot 406 and receives encoder counts (e.g., via TTL) from encoders on wheels 608, 610. Controller 606 and/or hub 604 is also in communication with an E-Stop button 612 (e.g., to trigger emergency stops), a de-energize wheel button 614 (e.g., to de-energize and lock out wheels 608, 610), a rear charger 616 (e.g., a rear near infrared (NIR) charger designed to slow down robot 406 as it approaches an object), and a fan 618 (e.g., to cool hub 604 and/or controller 606).

Also shown in FIG. 6 is a charging system 620 including a charging base 622, charging contacts 624, a charging controller 626, a battery 628 and a transformer 629 (e.g., including fuses and a power switch) transforming the energy from battery 628 to circuits with different voltage levels (e.g., 5V, 12V, 19V, 24V) to power the various components of robot 406, as described herein.

Further, architecture 600 includes edge devices 434 (e.g., edge detection devices, lasers, sonars, bumpers, etc.) and other components of robot 406 (e.g., that may be included in edge devices 434). For example, module 602 is in communication with an amplifier 630 configured to amplify and send audio signals to speakers 632, 634. Module 602 is also in communication with a rear display 636 (e.g., LCD), a front display 638 (e.g., including a left microphone 640 and a right microphone 642), a menu display 644. In the example embodiment, module 602 is also in communication with a USB switch 646 (e.g., a USB Type-A switch) configured to transmit signals to and receive signals from a depth camera 648 and a laser scanner 650 (e.g., via a 5p—USB).

As shown in FIG. 6, architecture 600 also includes a wireless communications component 652 and a custom board 654 including a microcontroller (e.g., for use in some embodiments of robot 406, such as robots configured to include a drink delivery app) in communication with a lid servo 656, an LED strip 658, and a lid door switch 660. For example, board 654 may control servo 656 and switch indicator 660 in order to facilitate receipt of an item and delivery of an item.

Notably, a person having ordinary skill in the art will appreciate that the various items and components shown in the present application could be utilized to configure/control robot 406 to perform a wide variety of tasks. Such embodiments, and modifications and changes thereof, are included in the scope of the present disclosure.

For example, as shown in FIG. 6, board 654 is used to drive LED communication, lid open/close servo 656, and lid status switch indicator 660. A lid of robot 406 opens and closes to serve drinks or provide other item delivery protection. The use of board 654 or others like it would vary or not exist at all depending on designs and needs of other upper robot bodies (e.g., the lower robot body may remain the same) that service different uses in the field (e.g., as described herein in further detail).

Figure 7:
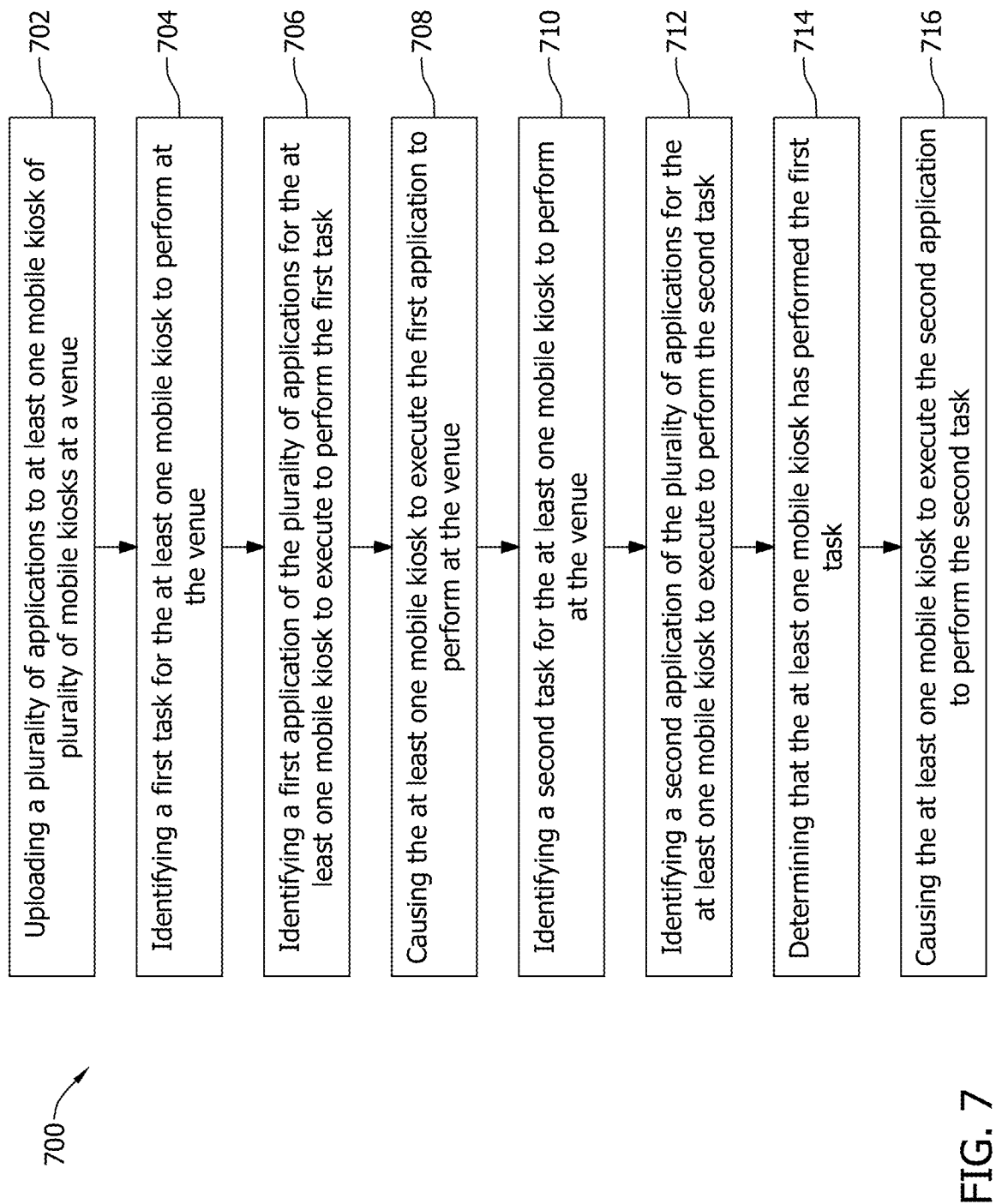
FIG. 7 illustrates an example method for mobile kiosk remote administration in electronic gaming, in accordance with the present disclosure.

FIG. 7 illustrates an example method 700 for mobile kiosk remote administration in electronic gaming, in accordance with the present disclosure. In the example embodiment, method 700 includes uploading 702 a plurality of applications to at least one mobile kiosk of a plurality of mobile kiosks at a venue, identifying 704 a first task for the at least one mobile kiosk to perform at the venue, and identifying 706 a first application of the plurality of applications for the at least one mobile kiosk to execute to perform the first task. Method 700 also includes causing 708 the at least one mobile kiosk to execute the first application to perform the first task, identifying 710 a second task for the at least one mobile kiosk to perform at the venue, and identifying 712 a second application of the plurality of applications for the at least one mobile kiosk to execute to perform the second task. Method 700 also includes determining 714 that the at least one mobile kiosk has performed the first task and causing 716 the at least one mobile kiosk to execute the second application to perform the second task.

In some embodiments, method 700 includes receiving new application data for a new application from an application distribution system and causing the new application data to be uploaded on to the at least one mobile kiosk. For example, method 700 may include identifying a mobile kiosk body type associated with the at least one mobile kiosk, determining that the mobile kiosk body type matches at least one mobile kiosk body type in the new application data indicating that the mobile kiosk body type can execute a task associated with the new application, and causing the new application data to be uploaded on to the at least one mobile kiosk based upon determining that the mobile kiosk body type matches the at least one mobile kiosk body type in the new application data.

Additional and/or alternative mobile kiosk (e.g., robot) embodiments are described in U.S. patent application Ser. No. 17/212,744, filed Mar. 25, 2021, which is incorporated herein by reference in its entirety. Certain example task functions are described below.

Example Item Delivery App

In various implementations, one or more robots 406 may include an app to provide and deliver items (e.g., food and beverage) to one or more recipients within an operations venue, such as a casino 251 (shown in FIG. 2B). More particularly, in at least one example embodiment, robot 406 may include a storage area, such as internal container system, which may be secured by a lid and arranged to contain one or more items, such as one or more food and/or beverage items, for delivery to one or more recipients.

Robot 406 navigates an operations venue, such as casino 251, to deliver one or more items. Each robot 406 may be in network communication, such as via a network interface device, with a server (e.g., servers 102). Likewise, each robot 406 may be in wireless communication, such as via a network interface device, with one or more wireless transmitters, such as one or more wireless beacons of an indoor positioning system that spans or covers at least a portion of casino 251. Wireless beacons may include, in one or more embodiments, any suitable wireless beacon, such as Google Eddystone beacons, Apple iBeacons, and the like.

During operation, a server may receive, generate, and/or distribute one or more delivery requests (e.g., a request for items, services, and the like), to one or more robots 406. A delivery request may include any of a variety of suitable information that enables robots 406 to fulfill a requested item delivery. For example, in at least some implementations, a delivery request may identify an item to be delivered, such as food and/or beverage contained within an internal container system of one or more robots 406, a delivery location (e.g., relative to one or more wireless transmitters or beacons), and/or a recipient to whom the item should be delivered. For example, the delivery location may include a position or location of a device 104A being played by a recipient, a location of a mobile communication device (e.g., smartphone) of a recipient, a location of a personal location device (e.g., a Radio Frequency Identification (RFID) tag) of a recipient, and the like.

In some embodiments, players or other users may initiate delivery requests in different ways, which may be received by a server. For example, the server may receive a delivery request from a particular EGM 104 in the operations venue (e.g., identified by a unique device ID of the EGM 104). EGMs 104 may, for example, provide a virtual user interface (e.g., GUI) or mechanical button through which a player can summon robot 406 for item delivery. Accordingly, the server may receive a request for item delivery from the "requesting EGM" and may assign a delivery request task (e.g., a task) to robot 406. In some embodiments, the server may receive a request for item delivery from a table management device of a gaming table (e.g., initiated by a dealer, perhaps on behalf of a player at a gaming table, identified by a unique table ID). In some embodiments, the server may receive a delivery request from a personal location device of a player or a mobile device of a player (e.g., mobile gaming device 256, via player app on their smartphone). In some embodiments, an operator of the server may manually submit, from a terminal, a delivery request for robot 406. In some embodiments, the server or robot 406 may automatically initiate a delivery request (e.g., periodically, according to a particular schedule, at the start of an operational shift, according to a predefined schedule (e.g., as related to a loyalty tier of a player), based upon one or more timers, and the like).

In some embodiments, the server may select a robot 406 from a list of robots that contains, within a respective internal container system, the item requested by a recipient. Likewise, the server may select a robot 406 that is also physically closest to a pickup location and/or a delivery location.

As a result, in at least some embodiments, the server may store a list or manifest of robots 406 currently operational within casino 251 (e.g., robots 406 not currently stowed, such as for recharging or repair). The manifest may also include a variety of other detail, such as which items each currently operational robot 406 contains within a respective internal container system, a current position of each robot 406, and the like.

Further, although the server may select or determine a robot 406 to fulfill a delivery request, in other embodiments, the server may broadcast a delivery request to one or more robots 406, and a robot 406 closest to a delivery location, a pickup location, and/or a robot 406 that includes the requested item may respond to the delivery request as well as provide a message to the server to indicate that the robot 406 has taken responsibility for the delivery request.

In response to receiving a delivery request, and if robot 406 already contains a requested item within a internal container system, robot 406 may control its propulsion system to navigate to a delivery location. As described herein, robot 406 may store (e.g., in file system 430) and/or otherwise access one or more maps, such as a static map and/or a thermal map, of casino 251, which facilitates navigation by robot 406 within casino 251. Specifically, in at least one embodiment, robot 406 may analyze the one or more maps to plot a course between a location of robot 406 (e.g., relative to one or more wireless beacons) and a delivery location.

On the other hand, if robot 406 does not contain the item within an internal container system (e.g., if the item is a specialized item, such as a specialized beverage or an order from a kitchen), robot 406 may initially navigate to a pickup location, where robot 406 may receive the item, such as from a bartender, wait staff, another robot 406, and the like. One or more sensors, (e.g., 434), and the like, may be included to detect receipt of the one or more items. In addition, internal container system may be temperature controlled (e.g., refrigerated and/or heated) to preserve a desired temperature of the item, such as cold for a beverage, warm for a food item, and the like. Moreover, in at least some implementations, a robot 406 may be operable to receive and fulfill a plurality of delivery requests. For example, robot 406 may navigate to a pickup location to obtain several items, following which robot 406 may plot a course between several delivery locations associated with each item, such as a shortest or otherwise optimal course between the several delivery locations.

When robot 406 arrives at a delivery location, robot 406 may receive one or more authentication credentials from a recipient, positioned or located near the delivery location. Authentication credentials may include any suitable identifying information of the recipient, such as one or more biometrics of the recipient, one or more images or photographs of the recipient, and the like. As described herein, robot 406 may acquire the authentication credentials from the recipient using devices 434, and the like. In addition, methods of authentication can include player name and password or PIN, physical key and/or combination locks, scanning a personal identity card (e.g., driver's license), authentication based on biometric data, such as using facial recognition (e.g., through camera devices), using biometric scanners, or the like.

In response to authenticating a recipient, robot 406 may provide the item requested by the recipient and contained within an internal container system. For example, robot 406 may unlock a lid of the internal container system to provide access to the item contained therein. In some embodiments, the internal container system may include a plurality of receptacles, compartments, or independently accessible storage areas, each of which may include a respective lid. Likewise, in some embodiments, internal container system may include a rotating cassette, such as a "lazy Susan," which may be controlled to provide one of a plurality of items to the recipient. In addition, in at least some embodiments, when an item is removed from the internal container system, robot 406 may flag or otherwise identify the location of the item following removal, such that a new item (of the same or a different type) can be refilled in the available location.

In these implementations, robot 406 may be capable of securely storing a plurality of items (e.g., beverages, food items, and the like) in individual compartments or containers for safety, cleanliness, and security. As robot 406 navigates a delivery route, robot 406 may provide access to each independently openable compartment or storage area when a respective recipient is authenticated, such that each recipient is only provided access to the recipient's respective item, keeping the other items stored by robot 406 secure and untampered.

Example Service Robot with Contactless Payment App

In some embodiments, robot 406 may include an app to transact with users via contactless payment. For example, robot 406 may include a reader device that accepts or facilitates contactless payment, such as an RFID, near field communication (NFC), and/or bluetooth low energy (BLE) receiver, positioned near a surface of robot 406. In some embodiments, the reader device may be identified by a visible symbol or lighting that identifies where the user is able to position a contactless payment device, such as mobile gaming device 256, for initiation of a contactless payment transaction.

As described herein, mobile gaming device 256 (or "mobile device") may be a smartphone that stores a "digital wallet" or "digital wallet app." More particularly, in some embodiments, the digital wallet may be installed on or otherwise facilitated by mobile gaming device 256. In some embodiments, the digital wallet may contain payment account information for various personal bank accounts and payment cards (e.g., debit cards, credit cards, player cards, casino accounts) of a player or user, from which the user may withdraw or deposit funds. The digital wallet may, in some embodiments, also contain loyalty card information for the user. In at least some embodiments, a player tracking system or other back-end system operated by the casino operator may maintain a financial account, such as a personal casino account, on behalf of the user and may allow the player to deposit funds into or withdraw funds from that personal casino account (e.g., as another source of funds).

In various embodiments, robot 406 may provide lighting or display a symbol or other indicia indicating when robot 406 has activated the reader device to accept a contactless payment. Robot 406 may additionally or alternatively provide a change in lighting to indicate when the robot 406 has effectively communicated with the mobile gaming device 256 and completed acquiring the payment information or completed the contactless payment transaction. Robot 406 may thus allow users to complete payment transactions via contactless payment for the various goods and/or services described herein, such as, for example, purchasing food or beverage, purchasing show and other event tickets, purchasing lodging or parking accommodations (e.g., hotel charges, valet charges), tipping staff, and/or other goods and services offered by the venue.

In some embodiments, robot 406 may provide various kiosk services and may allow contactless transactions for such services. For example, a player seated at a gaming device 104, a gaming table, or otherwise within the gaming venue, may interact with robot 406 to acquire gaming credit. For example, the reader device of robot 406 may receive various forms of payment, such as payment cards, printed tickets, and the like, to facilitate the addition of gaming credit and/or other monetary value to a user's digital wallet.

Accordingly, in one example, robot 406 may receive a payment card, such as a credit or debit card of the user (e.g., a using reader device). In response to receiving the payment card, the robot 406 may communicate with a digital wallet management server and/or a financial institution data center 270 (e.g., funds transfer data center) to facilitate the transfer of funds from an account associated with the payment card (e.g., a bank, crypto wallet, and/or credit card account) to another account stored by the digital wallet, such as a casino account.

More particularly, in at least some embodiments, robot 406 may receive an authorization request to add funds to a digital wallet of the user using a digital wallet app stored on mobile device 256 of the user, such as when the user inserts a credit or other bank card in a reader device and/or interfaces with a GUI provided on display of robot 406. The GUI may, for example, permit selection by the user of a monetary amount to be transferred from the user's credit or bank card to a casino account (or another account) in the user's digital wallet. In response to receiving the authorization request, robot 406 may transmit an authorization request message to the funds transfer data center 270 associated with the user, where the authorization request message can be configured to request adding the funds to the digital wallet of the user. Robot 406 may receive an authorization response from funds transfer data center 270, which may indicate that the transfer is complete or, on the other hand, that the transfer has been declined (e.g., for insufficient funds, etc.)

Accordingly, robot 406 may communicate with mobile device 256 via a first network, such as any suitable NFC, WiFi, Bluetooth, and or any other suitable wireless network. Likewise, to process an authorization request, such as to add funds to a user's digital wallet, robot 406 may communicate with one or more payment processor systems, such as a digital wallet management server and/or the funds transfer data center 270, via a second network, such as any suitable payment processor network. In some embodiments, the second network may include any ISO 8583 and/or ISO 20022 payment network configured to receive and process messages that conform to one or both of these standards. These standards generally provide specifications for the format and content of messages related to electronic transactions made by cardholders using payment cards and messages transmitted between financial institutions.

In another example, robot 406 may receive, using a reader, a printed TITO ticket, which may be encoded with a monetary value, such as using a bar code, a quick response ("QR" code), and the like. In response to receiving the printed ticket, robot 406 may communicate with the digital wallet management server and/or a financial institution datacenter 270 to facilitate the transfer of funds from the printed TITO ticket to an account stored by the digital wallet, such as the casino account. In addition, once funds are transferred from the printed ticket into a user's digital wallet, the digital wallet management server and/or another backend system may update an electronic record of the printed ticket to indicate that the ticket has been transferred to a user's digital wallet (e.g., to prevent subsequent re-use of the ticket).

In yet another example, robot 406 may receive, using the reader 362, a monetary currency, such as a U.S. bank note. In response to receiving the monetary currency, robot 406 may communicate with the digital wallet management server and/or financial institution datacenter 270 to facilitate addition of funds in the amount of the monetary currency to an account stored by the digital wallet, such as the casino account. The received currency may be stored by the reader, such as in a hopper or other storage area. In at least one embodiment, robot 406 may facilitate an electronic transfer of cryptocurrency, such as Bitcoin, from a cryptocurrency account of a user to a digital wallet of the user.

In another example, robot 406 may also receive one or more gaming chips from a player or user. To facilitate receipt of gaming chips, robot 406 may include a chip counter and/or a chip receptacle or storage area. As the user inputs gaming chips, robot 406 may count the value of each chip input by the user, as well as, in at least some embodiments, perform validation or verification of each gaming chip to ensure that the chips are not fraudulent. The aggregate value of the chips input by the user may be added to the user's digital wallet, and the chips may be returned to the casino exchange point (e.g., the casino cage).

As described elsewhere herein, in some embodiments, robot 406 may also transfer monetary value from a digital wallet of the user to one or more other types of currency. For example, robot 406 may receive a contactless payment from a user, and in response robot 406 may print and dispense a TITO ticket and/or paper currency equal to the value of the contactless payment. Robot 406 may also facilitate deduction of these funds from the digital wallet of the user.

In addition to facilitating the transfer of funds into and out of a digital wallet, Robot 406 may also permit contactless payment for goods and services. For example, robot 406 may function, in some ways, as a contactless payment point of sale ("POS") terminal. For instance, in at least some implementations, robot 406 may, as described herein, store one or more goods, such as food and beverage, within an internal storage area.

A user or player who wishes to purchase any of the goods contained within robot 406 or services offered for sale by robot 406 may initiate a contactless payment transaction between the reader and mobile gaming device 256 of the user. Specifically, the user may place mobile gaming device 256 proximate the reader to establish a wireless connection between the two devices (e.g., an NFC or Bluetooth connection). Once the connection is established, a contactless payment transaction may take place between robot 406 and mobile gaming device 256, where it will be appreciated, funds are deducted from the digital wallet of the user and transferred as payment in exchange for the purchased goods or services. In addition to purchasing goods (e.g., food and beverage), when a user purchases services, such as show tickets and the like, robot 406 may print and dispense the show tickets and/or another form of redeemable voucher, which the user may exchange for the services purchased from robot 406.

In addition to the features described herein, in at least some embodiments, one or more wireless beacons having rotating beacon IDs may be included in the systems and methods described herein, such as to improve communication security between mobile gaming devices 256 of casino patrons (e.g., players) and various casino devices such as electronic gaming devices 104, smart tables, various kiosks, including robots 406 arranged as kiosks, and the like. For example, in at least one embodiment, wireless beacons with changeable (e.g., "rotating") beacon IDs may be installed gaming devices 104 and/or robots 406.

A player may use their mobile gaming device 256 (e.g., mobile phone) to connect to a particular gaming device 104 or robot 406 and its associated beacon ID to facilitate various functionality between the gaming device 104 and/or robot 406 and the player's mobile gaming device 256 during a gaming session. During connection setup, the beacon of gaming device 104 and/or robot 406 requests a new beacon ID from a supporting backend system, such as a casino management system 114. Casino management system 114 generates a new, unique beacon ID and sends the beacon ID to the beacon of the gaming device 104 and/or robot 406.

The beacon changes its beacon ID (e.g., "rotates") to the new beacon ID and uses that ID to pair with the player's mobile gaming device 256. Mobile gaming device 256 provides a device ID and player authentication credentials to casino management system 114, which may authenticate one or both mobile gaming device 256 and the player. Upon successful authentication, the player and mobile gaming device 256 are successfully paired with gaming device 104 and/or robot 406 and the various functionalities provided by gaming device 104 and/or robot 406 can be allowed. The configurable, non-static nature of the IDs for the beacons of the casino devices enhances security from certain types of hacking by introducing dynamic ID generation and use for one-time pairing. During the next pairing attempt, gaming device 104 and/or robot 406 will receive a new, different ID, and thus will not advertise the same ID through more than one pairing. These and other features are described in additional detail by International Published Patent Application No. WO 2020/072362, entitled "System and Method for Changing Beacon Identifiers for Secure Mobile Communications," which is incorporated by reference herein in its entirety.

Accordingly, during operation, robot 406 may receive a relocation request, such as from the robot management system. The relocation request may identify a service location, such as a location of gaming device 104, a smart table, mobile gaming device 256 of the user, and/or any other service location to which robot 406 may be summoned for the purpose of facilitating a contactless payment transaction. In response to receiving the service request, and as described herein, robot 406 may navigate to the service location, which may be anywhere within the casino as well as outside the casino, in some cases.

Moreover, when robot 406 arrives at the service location, the player or user that initiated the service request may initiate a wireless connection between the user's mobile gaming device 256 and robot 406. For example, as described herein, the user may bring mobile gaming device 256 proximate reader 362 to initiate an NFC connection. Likewise, at greater distances, a Bluetooth or WiFi connection may be established.

Once the wireless (or contactless) connection between mobile gaming device 256 and robot 406 is established, robot 406 may receive, via the wireless connection, any of a variety of requests, such as an authorization request to add funds to a digital wallet of the user. In various embodiments, as described herein, funds may be added or transferred from a credit account, a cryptocurrency account, and/or bank account of the user, as well as in response to physical receipt of a TITO ticket, monetary currency (e.g., U.S. bank notes), gaming chips, and the like.

In the example embodiment, robot 406 (or a processor thereof) may transmit, such as wirelessly via the network, an authorization request message in response to receiving the authorization request from the user. The authorization request message may, for example, be transmitted to the digital wallet management server and/or funds transfer data center 270, which may, in turn, add and/or transfer funds to and/or from the digital wallet of the user. In addition to facilitating the transfer of funds to and from the digital wallet, as described above, robot 406 may also receive contactless payments for various goods and services, such as goods stored within robot 406 itself, other goods offered for sale within the casino, and/or services and events offered by the casino, such as tickets to shows and other attractions, and the like. These transactions may also be provided to the digital wallet management server and/or funds transfer data center 270 for processing. Accordingly, robot 406 may facilitate a variety of contactless payment features.

Example Security Services App

In some embodiments, robot 406 may be configured with an app to perform in a drop team role. The drop team role may involve robot 406 performing service operations associated with the casino venue nightly drop process, including, for example, exchanging and/or collecting a variety of "value instruments" collected by a gaming device, such as EGM 104, a gaming table, and/or any other gaming device. In various embodiments, the term "value instruments" may include, but is not limited to, paper currency, gaming chips, (which may be contained in portable gaming chip "racks") and/or paper tickets (which may be stored within different portions of an EGM, such as currency hoppers, cash boxes, bill stackers, ticket cans, the like). In addition, although the drop team role is primarily described below in reference to an EGM 104, as described herein, robot 406 may implement or perform a drop team role, including collection of currency and other items, in association with any suitable device, player, gaming table and the like within a casino.

In some embodiments, the drop team role may also include recording the gaming device game data (e.g., EGM 104 game play meters, and/or other coin-in and/or credit-in data). In one example, robot 406 may be configured to arrive at a gaming device, such as EGM 104, that is being serviced by a technician, or is scheduled to be serviced by the technician, to facilitate removal and secure storage of paper currency, paper tickets, and other items collected from the gaming device by the technician. In another example, robot 406 may securely dock with the EGM 104 cabinet, open the secure EGM 104 door to access bill/ticket validator 124, and/or exchange the existing bill/ticket validator can with an empty can.

In at least one example embodiment, robot 406 may include a storage area, which may be secured by a lid and arranged to contain one or more items, such as one or more value instruments, as described herein (e.g., paper currency, paper tickets, gaming chips, metal coins, gift cards, player tracking cards, and/or any other item and/or value instrument). In the example embodiment, the secure storage area also includes at least one lock, which may be used to prevent unauthorized access to the secure storage area. In addition, in at least some embodiments, robot 406 may include an input device, such as one or more buttons and/or a touchscreen display (e.g., a capacitive touchscreen display) capable of receiving user input. In at least one embodiment, robot 406 may also include one or more internal sensors, such as a pressure sensor, which may be used to detect opening of the lid, placement of one or more value instruments within the secure storage area, tampering with the secure storage area, and the like.

Accordingly, in at least some implementations, robot 406 may receive, via the input device, an input from a requestor, such as a technician, a player, a "pit boss" or dealer at a gaming table, or another user who wishes to deposit gaming chips or other currency within robot 406. In some embodiments, the input may, for example, be provided by the requestor to unlock the secure storage area. For example, the requestor may interact with a graphical user interface of the input device to select a control option, such as "lock", "unlock", "open" or "close." In response to receiving the requestor selection, robot 406 may control the secure storage area and/or the lock thereof to perform the associated action (e.g., to lock and/or unlock the lid of the secure storage area). In at least some embodiments, robot 406 may require that the requestor complete an authentication process prior to unlocking the secure storage area. For example, the requestor may be required to provide a biometric, such as a fingerprint or facial recognition image, to biometric scanners or to provide an identification card (e.g., to be scanned by a camera device or card reader). As described herein, methods of authentication can include player name and password, physical key and/or combination locks, scanning a personal identity card (e.g., driver's license), authentication based on biometric data, such as using facial recognition (e.g., through camera devices), using biometric scanners, or the like.

As a result, in response to receiving an unlock and/or open command from the requestor, the lid may be unlocked and opened or raised, as shown, permitting access to the secure storage area. The requestor may, in addition, manually unlock a cabinet of EGM 104 to gain access to one or more items stored therein, such as one or more value instruments that the EGM 104 has collected over a period of time (e.g., within twenty-four hours). The requestor may thus remove the value instruments stored within EGM 104, and deposit the removed value instruments into the secure storage area of robot 406, where the value instruments may be contained or housed for transport to a delivery location or collection area, such as a casino cage.

During deposit of value instruments within robot 406, one or more internal sensors of robot 406 may detect placement of the value instruments within the secure storage area, such as by sensing a pressure change (e.g., a weight of the value instruments) by one or more pressure sensors. In some embodiments, a camera device may detect transfer of the value instruments from EGM 104 to the secure storage area. In some embodiments, one or more indicia (e.g., weight, volume, etc.) may be stored within memory devices of robot 406 to memorialize or otherwise record an initial quantity of the value instrument(s) deposited within robot 406. The camera device may also be controlled to monitor the requestor during transfer of value instruments from EGM 104 into the secure storage area, such as to ensure that no value instruments are lost, misplaced, or stolen.

Following transfer of all or a portion of the one or more value instruments from EGM 104 to the secure storage area, the requestor may again select an option from the input device, such as an option to "lock" and/or "close" the secure storage area. In response to selection of such an option, processor 320 may control the secure storage area and/or lock thereof to perform the associated action (e.g., to close and lock the lid of the secure storage area). Thus, the requestor may interact with robot 406 to transfer value instruments, such as paper currency, paper tickets, (e.g., as contained in a removable bill stacker) and the like, from a hopper or other storage area of EGM 104, or any other device or location, into the secure storage area of robot 406. In some embodiments, robot 406 may provide a receipt to the requestor. For example, robot 406 may display an encoded image, such as a quick response ("QR") code, which contains transaction details, such as time and/or date-stamp, amount deposited, identifying information of the requestor, and the like.

In addition to these features, in at least some embodiments, robot 406 may provide one or more messages to a server system. The one or more messages may include, for example, data indicating that robot 406 has received the one or more value instruments, data indicating that the secure storage area has been locked, the information related to weight and/or quantity, as described above, and/or any other suitable data intended, for example, to ensure the security of the one or more value instruments during transport by robot 406 to the delivery location (e.g., the casino cage).

In various embodiments, robot 406 may receive, such as from a server, a request for drop box services, which may include a pickup location and/or requestor information. The pickup location may specify a location to which robot 406 should navigate for pickup of value instruments (e.g., an EGM 104, gaming table or a player who wishes to deposit chips). In response, robot 406 may control its propulsion system (e.g., a drivetrain assembly) to navigate robot 406 to the pickup location, and/or to unlock the secure storage area, as described herein. In various embodiments, and as described elsewhere herein, the requestor (e.g., a player, a technician, or another user) may provide a request for drop box services to robot 406 using a handheld communication device (e.g., a smartphone), an EGM 104 interface, and/or any other communication system that can relay the request to robot 406.

Likewise, in at least some embodiments, robot 406 may receive, such as from a server, a deposit location, which may specify, for example, a location to which robot 406 should navigate for depositing of value instruments (e.g., a casino cage). In response, robot 406 may control its propulsion system (e.g., a drivetrain assembly) to navigate robot 406 to the deposit location, and/or to unlock the secure storage area, as described herein, on arrival at the deposit location.

Moreover, in some embodiments, robot 406 may receive, such as from a server, a monitoring location, which may specify, for example, a location to which robot 406 should navigate for performing monitoring, surveillance, and/or other security related functions. In response, robot 406 may control its propulsion system (e.g., a drivetrain assembly) to navigate robot 406 to the monitoring location. Robot 406 may also, upon arrival at the monitoring location, control camera devices to acquire one or more images of monitoring location.

In some embodiments, robot 406 may also, as described herein, escort a player and/or another user between locations, such as to ensure the safety and/or security of the user. For example, in at least one implementation robot 406 may receive, via an input device, a request from the user to be escorted. In response, robot 406 escorts the user, such as by following behind the user until the user instructs robot 406 that the user has arrived at a desired destination (e.g., the user's vehicle in a casino parking garage, the user's hotel room, etc.)

Moreover, to ensure the safety and security of the user, robot 406 may control a camera device to monitor the user (e.g., by taking photos or video of the user) during transit to ensure that the user remains physically safe as well as to function as a deterrent to potentially hazardous individuals, such as within a parking garage, etc. Further, robot 406 may detect a variety of other health related issues, such as a user who trips and falls or is otherwise incapacitated, and the like.

Example Service Technician App

In some embodiments, robot 406 may be configured with an app to perform in a service technician or diagnostic role. The service technician and/or diagnostic role may involve robot 406 performing service operations and/or device inspections of any of a variety of devices, electronics, and/or property within a venue. In addition, in the example embodiment, and as described herein, robot 406 may also be configured to collect data from devices, electronics, and/or property within the venue.

In both the service technician or diagnostic role as well as during data acquisition, operations may be performed on devices, such as EGMs 104, as well as other electronic gaming devices and electronics, such as kiosks, chairs, intelligent or electronic chairs, benches, intelligent or electronic benches, pedestals, podiums, and/or any other device or property that robot 406 can receive data from, interface with, visually observe, and the like. Accordingly, although EGMs 104 are primarily described below in association with the service technician or diagnostic role, in various embodiments, robot 406 may perform these and other services in association with other electronic gaming devices, such as table games (e.g., smart or electronic table games), as well as any other electronic device within a casino.

During the performance of data collection services, robot 406 may be configured to receive and record any of a variety of data, such as diagnostic data, gameplay data, and the like, from an EGM 104. In an example implementation, robot 406 is in wireless communication with an EGM 104 and receives data via the wireless interface (e.g., such as one of network interface devices). In various embodiments, robot 406 may initiate communications with EGM 104 and communicate with EGM 104 via a wireless protocol, such as, but not limited to, BLUETOOTH, infrared, near field communication (NFC), ultra-wide band, narrow band internet-of-things (IOT), WiFi, cellular and/or ZIGBEE. In some embodiments, robot 406 may also communicate with EGM 104, such as by connecting to a wired connection port that facilitates wired or hardwired connection with EGM 104.

In an example implementation, the wireless interface is a secure wireless interface with the game play data being encrypted using (e.g., Triple DES, RSA, Blowfish, Twofish, AES, and/or another suitable encryption protocol) by the EGM 104 prior to transfer to robot 406. In some implementations, the wireless interface is a unidirectional interface configured to transmit data from the EGM 104 to be received by robot 406. In some implementations, the wireless protocol is bidirectional allowing both the EGM 104 and robot 406 to transmit and receive data. In addition, in at least some embodiments, robot 406 may scan encoded data that is displayed by an EGM 104, such as a quick response (QR) code, a bar code, and/or another form of encoded data to receive gameplay data, diagnostic data, and/or other machine data. In some cases, a series of encoded images may be displayed for image capture by robot 406, which may facilitate providing any volume of data to robot 406, such as, for example, where each encoded image includes a block or subset of a larger dataset.

Moreover, in some implementations, robot 406 receives and records data from the EGM 104 as robot 406 is proximate or passes by EGM 104. Similarly, in some implementations, robot 406 records data in real-time from the EGM 104, such as during play of EGM 104 by a player and/or otherwise when robot 406 is proximate EGM 104.

In some example implementations, robot 406 also stores the received data in a memory device for later upload to a server. In some implementations, robot 406 is in network communication with the server, and actively uploads the data at the time it is received from the EGM 104. To this end, robot 406 may wirelessly communicate with Server, such as via any suitable wireless communications protocol. In various embodiments, robot 406 may communicate with Server a wireless protocol, such as, but not limited to, BLUETOOTH, infrared, near field communication (NFC), ultra-wide band, narrow band internet-of-things (IOT), WiFi, cellular and/or ZIGBEE. In some embodiments, robot 406 may also communicate with a server, such as by connecting to a docking station and/or another wired connection port that facilitates wired connection (e.g., via Ethernet) with the server. As described herein, data may be encrypted by robot 406 prior to transfer to the server. In addition, it should be understood that the server may coordinate with another backend system, such as any of servers 106-114 (e.g., casino management system server 114) to manage robot 406 in any of the various robot functions and scenarios described elsewhere herein, such as for example, determining that the EGM 104 is actively in play by querying casino management system server 114 to determine whether, for example, the EGM 104 has deposited credits and/or has recently played a game round.

In at least one implementation, robot 406 may also use real-time game play data to create a real-time heat map indicating where patrons are actively playing EGMs 104 in the casino and the characteristics of their play, e.g., coin-in, rate of play, coin-out, etc.

In the service technician or diagnostic role, robot 406 may be configured to perform device inspections of EGMs 104. In some embodiments, the Server or other system server may periodically (e.g., weekly) schedule device inspections of EGMs 104 within a venue. Similarly, in some embodiments, robot 406 may automatically perform a device inspection of an EGM 104, such as when an item delivery is performed and/or if a previous device inspection time for an EGM 104 exceeds a pre-determined inspection threshold. In some embodiments, players or support staff can request a device inspection as well.

To initiate a device inspection, robot 406 may move (e.g., by controlling its propulsion system or drivetrain assembly), to the location of the EGM 104 to begin an inspection process. In some embodiments, the Server provides the EGM 104 location to the assigned robot 406 as a part of the request assignment, where in other embodiments, robot 406 receives a device identifier for the target EGM 104 and locates the EGM 104 automatically (e.g., via static map, via a location request to a database, via manual search).

Once at or near the target device location, robot 406 may begin an inspection process. In some embodiments, robot 406 may not be able to complete the inspection process if the target device is occupied. As such, the robot 406 may initially scan the area in front of the target device and determine whether the device is occupied (e.g., whether a player is standing or sitting in front of the device). If the target device is occupied, robot 406 may delay or cancel the inspection process and may transmit a message to the Server indicating a delay on the inspection request. If the target device is unoccupied, or if robot 406 is configured to perform the inspection process regardless of current device use, robot 406 continues the inspection process.

The inspection process may include one or more inspection tasks. In some embodiments, robot 406 may capture an image of the target device and compare the captured image to a baseline image to determine, for example, whether current brightness of the target device is within acceptable range, whether the device is powered on, whether edge lighting is fully functional, whether there is any physical damage to the cabinet, button deck, displays, chair, reels, or other visible device components. In some embodiments, robot 406 may implement a suitable machine learning algorithm, such as an algorithm that enables robot 406 to distinguish between portions of EGM 104 and debris surrounding EGM 104, and or between functional or undamaged portions of EGM 104 and damaged or non-functioning portions of EGM 104. Likewise, robot 406 may use the algorithm to recognize human occupants or players, as well as any of a variety of other objects, conditions, and the like.

In some embodiments, robot 406 may establish a wireless connection with the device (e.g., as described herein). Once connected to the target device, robot 406 may initiate diagnostic routines and may capture digital images or video of the target device or particularly of the output occurring on the display (e.g., evaluating the graphical output for error codes, alerts, or the like). After the inspection process is complete, robot 406 may transmit an inspection completion message to the server or database for tracking the completion of the inspection and optionally any results of such inspection. In addition, in some embodiments, robot 406 may provide an alert or other notification, such as to Server, indicating that EGM 104 requires maintenance or is otherwise damaged or needs cleaning. In some embodiments, such as if robot 406 includes a waste receptacle or other secure storage area, robot 406 may remove debris. Likewise, in some embodiments, robot 406 may be capable of performing one or more repairs to EGM 104, such as replacing damaged or defective parts, uploading new or updated firmware or software, and the like.

Example Celebration Services App

As described elsewhere herein, in some embodiments, robot 406 is includes an app to provide celebration services. For example, one or more robots 406 celebrate casino gaming award related events (e.g., jackpot awards, tournament winners, bingo winners, etc.) and/or patron loyalty award related events (e.g., scatter awards, hot-seat awards, random bonusing awards for carded and uncarded patrons, etc.) by displaying a light-show (e.g., on any number of LEDs coupled to robot 406), playing music, displaying a congratulations message on a display, "dancing" and spinning around, and/or other fun celebratory actions.

In some embodiments, multiple active robots 406 are operational in a venue and, upon the occurrence of a patron hitting a jackpot award at EGM 104, begin a celebration display with all or a portion of robots 406 traveling to the vicinity of EGM 104 and, when they're all in a predetermined proximity to EGM 104, to each other, and/or in another predefined area, begin spinning, dancing, displaying lights from lasers (e.g., as a laser show), causing fog or smoke to be emitted (e.g., from a fog or smoke machine coupled to robot 406), displaying flashing lights, playing music, announcing congratulation messages (e.g., "woo-hoo", "award winner", big winner", "congratulations", etc.) and displaying congratulations screens on each of robots 406 (e.g., in some embodiments specific to the jackpot/award won and/or the game the jackpot/award was presented in). In some embodiments, one or more robots 406 may perform the celebratory actions described herein without traveling to a particular location (e.g., the vicinity of EGM 104 as described above). For example, one or more robots 406 may celebrate in their current location as a way to communicate to players in other areas of the casino or venue (e.g., not just at the location of the jackpot/award, etc.) that a particular event (e.g., award of a jackpot) has occurred.

In some embodiments, the robots participating in the celebration all operate in synchronization, performing a predetermined choreographed dance routine (e.g., line dancing). In some embodiments, the celebration follows the theme of the EGM game awarding the jackpot, e.g., a buffalo stampede themed celebration, e.g., displaying and/or mimicking running buffalos and announcing "buffalo!", for a jackpot award hit on an Aristocrat "Buffalo" themed game.

In some embodiments, a celebration performed by one or more robots 406 may be performed in response to a generated service request based upon certain trigger conditions. For example, a service request for a celebration may be triggered based on a game event (e.g., occurrence of a jackpot win, feature trigger, etc.) and/or based upon a scheduled event (e.g., the beginning of a tournament, etc.). Such celebration service requests may include dispatching one or more robots 406 to a location of the patron (e.g., the EGM where a jackpot was presented) to provide any of the various celebration services described herein. In some embodiments, robots 406 may be configured to provide hand-pay services, as described herein, for events that are celebrated by robots 406 (and/or any other event at a casino).

In some embodiments, a request may be generated and/or a celebration may be triggered in response to a server (e.g., server 110) indicating that a patron has a birthday on that particular day and/or a certain threshold has been reached in the patron loyalty account (e.g., a threshold number of loyalty points reached). For example, one of the servers and/or robot 406 described herein may determine the identity of at least one patron at a casino. Server 110 may then communicate that at least one of the patrons has a birthday. Accordingly, a server may control at least one robot 406 to perform a celebration (e.g., "singing" (outputting audio) a happy birthday song and dancing) for that patron (e.g., wherein the location of the patron may be determined by any of the servers described herein and/or robot 406 (e.g., via facial recognition)).

In some embodiments, a patron may be able to customize (e.g., via mobile gaming device 256 and/or EGM in communication with robot 406 and/or another server) at least a portion of a celebration performed by robot 406. For example, a player who has won a jackpot may not want attention attracted to them and/or the EGM where the jackpot was presented (e.g., for security and/or privacy purposes). Accordingly, in some embodiments, a player may be presented with an option for a celebration to be performed (e.g., at device 256 and/or an EGM) by robots 406 before the celebration occurs. In some embodiments, a player may be able to customize portions of the celebration (e.g., how much information (jackpot win amount, player name, etc.) is displayed by robots 406). In some embodiments, a player may request (e.g., via device 256, an EGM, and/or robot 406) a celebration be performed by at least one robot 406. For example, a player may receive a message at device 256 (e.g., from any of the servers described herein) asking if the player would like a celebration to be performed (e.g., for a birthday, jackpot win, etc.). Further, a player may transmit a request to a server that a celebration be performed (e.g., for a relative's birthday, an anniversary, etc.). The server may be configured to authenticate the request (e.g., via inputs from casino personnel and/or verifying information (e.g., a birthday) at server 110) and cause at least one robot 406 to perform the requested celebration. Further customizations for celebrations (e.g., how long the celebration will last, where the celebration will occur, different light/sound/video configurations) may be inputted to a server by patrons and/or casino personnel and implemented by robots 406.

In some embodiments, celebrations performed by one or more robots 406 may be scheduled for a specific time and/or at predetermined intervals. For example, one or more robots 406 may be controlled to perform a specific celebration at a certain time each day (e.g., wherein the celebration is themed for a specific venue, game, etc.). In some embodiments robots 406 are configured to perform scheduled celebrations in order to advertise different events. For example, robots 406 may perform a celebration and display an advertisement/promotion to attract patron attention to the advertisement. As an example, one or more robots 406 may advertise an upcoming concert by dancing and playing a song that will be performed at the upcoming concert. Further, robots 406 may be configured to sell tickets for an upcoming advertised event so that a patron who sees the celebration (advertisement) can purchase a ticket for the advertised event (and/or any other event) directly at robot 406.

In some embodiments, robots 406 may perform celebrations in response to real-time events (e.g., including gaming events, but also other live events such as sporting events). For example, if a major sporting event is occurring on a particular day, robots 406 may be configured to perform celebrations in response to certain events occurring in the sporting event (e.g., a score change, the beginning/ending of a game). Robots 406, in the various embodiments described herein, may display messages relating to the specific celebration (e.g., in sporting event embodiments, 'Team X goal scored," "Start of second half, place bets now," "Game starting soon, place bets now," etc.). Further, robots 406 may be configured to accept inputs and place wagers regarding advertised events (e.g., sporting events).

As an example, one or more robots 406 are configured to monitor bingo game play (the bingo ball call) and, if a patron's bingo card wins a bingo or other award the robot 406 alerts the patron and, in some examples, announces "bingo", and does a celebration performance, e.g., a robot "dance", plays a song, etc. As another example, one or more robots 406 are configured to monitor keno game play (the keno ball call or keno board) and if a patron's ticket wins an award the one or more robots 406 alerts the patron and, in some examples, announces "keno winner" and does a celebration performance, e.g., a robot "dance", plays a song, etc.

As yet another example, one or more robots 406 are notified (e.g., by a server), that a jackpot (e.g., a progressive jackpot) is above a threshold amount (e.g., $10,000, $100,000, $1,000,000, etc.) and in reaction to the notification robot 406 may announce, e.g., "Aristocrat Dragon Link Grand Progressive is now above $50,000" in an exciting manner and, e.g., display flashing lights, dance, spin and run around, display exciting video, etc. In some embodiments, a robot 406 in a first area of the casino venue is notified (e.g., by a server) that a jackpot has just been awarded in a second area of the casino venue and, in response to the notification, the robot may announce and celebrate the jackpot (e.g., "an Aristocrat Dragon Link Grand progressive of $50,901 has just been awarded near the Show Room") in an exciting manner (e.g., display flashing lights, dance, spin and run around, display exciting video, etc.).

In some implementations, robot 406 is configured to provide photo/video services at the scene of a celebration. For example, robot 406, using a camera device, presents a video display of one or more patrons near/at the celebration on a display device and, in response to receiving an input from a patron captures a photograph/video of one or more patron celebrating. Further, robot 406 may upload the photograph/video to a server and, in some embodiments, prints a ticket to provide to a patron including a link to the photograph on the server. In some embodiment, robot 406 may display a QR code in addition to and/or in place of printing a ticket. The patron can then access the link (e.g., based upon scanning the QR code and/or accessing the link on the ticket, as examples) to retrieve a copy of the photograph/video.

In some embodiments, robot 406 enables the patron to provide identifying information (e.g., via reading the patron's loyalty card, or other ID). Further to this example, the robot then uploads the patron information to the server and the server associates the photograph/video with the patron's information. In some instances, loyalty system server 110 is in communication with a server and, upon the patron accessing their patron loyalty account, enables the patron to access and/or retrieve the photograph/video via loyalty account server 110.

In some embodiments, robot 406 enables the patron to provide their social media site account information (e.g., their Facebook® account information, etc.) and have the photograph/video uploaded directly to the patron's social media site. In some embodiments, robot 406 is configured to enable the patron to take their photograph with an EGM 104 game screen displaying a winning outcome (e.g., a jackpot award). In some embodiments, robot 406 is configured to enable a patron to take their photograph with another person or another robot. In some embodiments, robot 406 is configured to overlay a photograph/video with, as examples, a border, image, animation and/or watermark (e.g., including casino venue branding information or other artwork). In other words, a photograph taken by robot 406 at an EGM 104 may be overlaid, by robot 406, with a logo, border, etc.

In some embodiments, robot 406 is configured with photographic facial detection, auto-frame, and/or auto-lighting capabilities. In some embodiments, robot 406 is configured with facial recognition software enabling the robot to detect and properly center a patron's face when taking a photograph/video (e.g., at/during a celebration), detect whether a patron is smiling, their eyes are open, etc. In some embodiments, robot 406 is configured with light emitting devices, e.g., surrounding a display device in order to take/generate higher-quality photos/videos. Further, robot 406 may be configured to detect the lighting of the patron's face and, using the light emitting devices, automatically correct the lighting brightness and color (e.g., by adjusting the light output of the light emitting devices) when taking a photograph/video of the patron. In some examples, the light emitting devices are tri-color LEDs.

In some embodiments, robots 406 may display certain persona interactions based on a current celebration activity or task currently being performed by robot 406. For example, upon activation (e.g., by receiving a remote celebration task), robot 406 may display a moving face, facial expressions, or animations while robot 406 is moving to a destination (e.g., bobbing back and forth, searching eye movements, perspiring, or the like). Robot 406 may display facial expressions and lip movements while interacting with other robots and/or players at a celebration scene (e.g., emulating articulation of audible interactions such as lip-syncing to songs). Such persona animations allow nearby players to understand what robot 406 are currently doing, as well as comforting and easing human interaction with robot 406.

Example Selfie/Photography Services App

In some embodiments, robot 406 includes an app to provide "selfie" services. For example, patrons of a casino may desire to have their picture taken (e.g., individually or in a group) but may not want to hand their phone and/or camera off to a stranger in order for their picture to be taken. Further, a patron may desire a higher-quality picture be taken (e.g., as a souvenir, for social media purposes, etc.) than their camera and/or phone typically takes. Accordingly, robot 406 is configured to take high quality photos (e.g., by including high-quality camera(s) on robot 406, other devices on robot 406 to facilitate high-quality picture taking (e.g., a ring light), and/or configuring robot 406 to perform image processing (e.g., to adjust brightness, remove red-eye, etc.)) of patrons and provide access of the photos to authorized patrons (e.g., patrons presenting credentials that are authenticated by robot 406 and/or a server as described herein).

In an example, robot 406, using a camera device, presents a video display (e.g., a live feed) of a patron on a display device and, receiving an input from a patron (e.g., via a user I/O device and/or at a desired time selected by the patron (e.g., on a timer)), captures a photograph (e.g., and/or video—photographs/pictures, as used herein, may also include videos, or a motion photo (e.g., iPhone Live Photo) recording a video for a period of time (e.g., 1.5 seconds) before and after a photo is taken) of the patron (e.g., and other patrons if desired). Further to this example, robot 406 uploads the photograph to a server and, in some embodiments, prints a ticket, using a ticket printer, to provide to the patron including a link to the photograph on the server. In some embodiments, robot 406 is configured to print a copy of the photograph itself (e.g., via a ticket printer and/or another printing device coupled to robot 406). In some embodiments, robot 406 may display a QR code in addition to and/or in place of printing a ticket. The patron can then access the link (e.g., based upon scanning the QR code and/or using the ticket, as examples) to retrieve a copy of the photograph. In some embodiments, robot 406 may provide a patron access to a photograph via NFC, Bluetooth, Wi-Fi, cellular, etc. wireless techniques as described herein.

In some embodiments, robot 406 enables the patron to provide their identifying information (e.g., via reading the patrons loyalty card, or other ID, using a card reader). Further to this example, robot 406 then uploads the patron information to the server and the server associates the photograph with the patron's information. In some instances, loyalty system server 110 is in communication with a server and, upon the patron accessing their patron loyalty account, enables the patron to access and/or retrieve the photograph (e.g., and/or other photographs/videos) via loyalty account server 110.

In some embodiments, robot 406 enables the patron to provide their social media site account information (e.g., their Facebook® account information, etc.) and have the photograph uploaded directly to the patron's social media site. In some embodiments, robot 406 may upload a copy of the photograph to a server that controls a copy of the photograph to be displayed at a photo station (e.g., on the casino floor). For example, similar to how some amusement park rides have cameras that take pictures of patrons during the ride, and allow patrons to view and/or purchase copies of the pictures after the ride is over, robot 406 is configured to implement a similar system on a casino floor. In other words, robot 406 may upload pictures to a separate location in the casino where a patron can view/print their picture(s) and decide whether to purchase copies and/or electronic access to the picture(s).

In some embodiments, robot 406 is configured to enable the patron to take their photograph with an EGM 104 game screen displaying a winning outcome (e.g., a jackpot award). In some embodiments, robot 406 is configured to enable a patron to take their photograph with another person or another robot. As an example, a server notifies robot 406 that a celebrity is in the proximity of a VIP patron and robot 406 then guides the patron to the celebrity to have their photographs taken. In some embodiments, robot 406 is configured to overlay a photograph with, as examples, casino venue branding information and/or other artwork (e.g., a photograph taken at an EGM 104 is overlaid with a logo, etc.).

In some embodiments, robot 406 is configured with photographic facial detection, auto-frame, and/or auto-lighting capabilities. In an example, a robot 406 is configured with facial recognition software enabling the robot to detect and properly center a patron's face when taking a photograph, on a group of patrons when taking a photograph (e.g., so that a picture of, as an example, 5 patrons is centered on the entire group (e.g., with equal open spaces on either side), not just one particular patron), detect whether a patron is smiling, their eyes are open, etc. In an example, a robot 406 is configured with light emitting devices (e.g., a ring light surrounding a display device). Further to this example, robot 406 is configured to detect the lighting of the patron's face and, using the light emitting devices, automatically correct the lighting brightness and color (e.g., by adjusting the light output of the light emitting devices) when taking a photograph of the patron. For example, if robot 406 determines that a face of a patron is showing up as too dark, robot 406 may increase the light provided by the light emitting devices (e.g., and decreasing the light provided by the light emitting devices if a face of a patron is showing up as too light). In some examples, the light emitting devices are tri-color LEDs, allowing the robot to adjust the lighting hue (e.g., from a warm white to a cool white light, add color effects, etc.).

In some embodiments, a patron may be able to customize (e.g., via mobile gaming device 256 and/or EGM in communication with robot 406 and/or a server) at least a portion of a picture taken by robot 406. For example, after taking a picture, robot 406 may display a copy of the picture. A patron may interact with a display (e.g., a touchscreen device) in order to modify the picture. For example, a patron may adjust the picture according to different image processing techniques (e.g., applying one or more filters (e.g., to the entire picture or to just a portion the picture, such as one or more faces of a patron), adjusting color/brightness, adding other images (e.g., stickers, animations, etc.), adding borders, adding one or more backgrounds to the photo, etc.). Robot 406 then saves the edited copy of the picture and may provide the patron (e.g., via the techniques described herein) access to the edited copy of the picture, as well as the original copy of the picture. In some embodiments, robot 406 is configured to automatically apply image processing features to photographs (e.g., to generate higher-quality photographs).

In some embodiments, robot 406 may be summoned to take a picture (e.g., in response to an input at an EGM and/or mobile device of a player and communicated to a server). In some embodiments, robot 406 is configured to roam the venue/casino floor and take pictures at predetermined intervals (e.g., periods of time, upon detection of a certain number of faces (e.g., a large group), etc.). In some embodiments, robot 406 is configured to use facial recognition techniques to recognize certain patrons (e.g., celebrities, VIPs, etc.) and take pictures of the certain patrons. In some embodiments, upon recognition of a patron, robot 406 is configured to communicate with a server to determine patron preferences (e.g., whether the patron would like pictures taken of them or not) and then take pictures of the patron if the patron preference is set such that they would like pictures of them taken.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A mobile kiosk management (MKM) system comprising:
a plurality of mobile kiosks deployed within a venue comprising a plurality of gaming devices; and
a MKM server in communication with the plurality of mobile kiosks, wherein the MKM server comprises at least one processor and at least one memory device storing instructions which, when executed by the at least one processor, cause the at least one processor to:
upload a first plurality of applications to at least one mobile kiosk of the plurality of mobile kiosks based upon determining that the at least one mobile kiosk has a first body type that allows the at least one mobile kiosk to execute first tasks associated with the first plurality of applications;
upload a second plurality of applications to one or more mobile kiosks of the plurality of mobile kiosks based upon determining that the one or more mobile kiosks have a second body type that allows the one or more mobile kiosks to execute second tasks associated with the second plurality of applications, wherein the second plurality of applications includes at least one different application from the first plurality of applications based on at least one hardware difference between the at least one mobile kiosk and the one or more mobile kiosks;
identify a first task for the at least one mobile kiosk to perform at the venue;
identify a first application of the first plurality of applications for the at least one mobile kiosk to execute to perform the first task;
cause the at least one mobile kiosk to execute the first application to perform the first task;
identify a second task for the at least one mobile kiosk to perform at the venue;
identify a second application of the first plurality of applications for the at least one mobile kiosk to execute to perform the second task;
determine that the at least one mobile kiosk has performed the first task; and
cause the at least one mobile kiosk to execute the second application to perform the second task.

2. The MKM system of claim 1, further comprising a user interface, wherein the instructions further cause the at least one processor to:
receive user input selecting the first task; and
identify the first task for the at least one mobile kiosk to perform at the venue based upon the user input.

3. The MKM system of claim 1, wherein the at least one memory device stores a schedule, and wherein the instructions further cause the at least one processor to identify the first task for the at least one mobile kiosk to perform at the venue based upon the schedule.

4. The MKM system of claim 1, wherein the at least one memory device stores a dynamic task queue, and wherein the instructions further cause the at least one processor to identify the first task for the at least one mobile kiosk to perform at the venue based upon an order of tasks in the dynamic task queue.

5. The MKM system of claim 1, wherein the instructions further cause the at least one processor to:
receive new application data for a new application from an application distribution system; and
cause the new application data to be uploaded on to the at least one mobile kiosk.

6. The MKM system of claim 5, wherein the instructions further cause the at least one processor to:
identify a mobile kiosk body type associated with the at least one mobile kiosk;
determine that the mobile kiosk body type matches at least one mobile kiosk body type in the new application data indicating that the mobile kiosk body type can execute a task associated with the new application; and
cause the new application data to be uploaded on to the at least one mobile kiosk based upon determining that the mobile kiosk body type matches the at least one mobile kiosk body type in the new application data.

7. The MKM system of claim 1, wherein the instructions further cause the at least one processor to:
receive updated application data for the first application from an application distribution system; and
cause the updated application data to be uploaded on to the at least one mobile kiosk.

8. The MKM system of claim 1, wherein the instructions further cause the at least one processor to:
identify a group task for at least a subset of the plurality of mobile kiosks to perform; and
cause at least the subset of the plurality of mobile kiosks to perform the group task simultaneously.

9. The MKM system of claim 1, wherein the first task comprises at least one of a kiosk task, a delivery task, a celebration task, a digital wallet task, a photography task, a drop box task, or a data collection and diagnostic task.

10. The MKM system of claim 1, wherein the instructions further cause the at least one processor to:
identify the first application of the first plurality of applications for the at least one mobile kiosk to execute to perform the first task, wherein the first application is not included in the second plurality of applications; and
cause the at least one mobile kiosk to execute the first application to perform the first task based upon the at least one mobile kiosk having the first application installed and the one or more mobile kiosks not having the first application installed.

11. The MKM system of claim 1, wherein the at least one different application comprises a drink delivery application, and wherein the at least one hardware difference comprises a drink delivery hardware compartment.

12. At least one non-transitory computer-readable storage medium with instructions stored thereon that, in response to execution by at least one processor, cause the at least one processor to:
upload a first plurality of applications to at least one mobile kiosk of a plurality of mobile kiosks at a venue based upon determining that the at least one mobile kiosk has a first body type that allows the at least one mobile kiosk to execute first tasks associated with the first plurality of applications;
upload a second plurality of applications to one or more mobile kiosks of the plurality of mobile kiosks based upon determining that the one or more mobile kiosks have a second body type that allows the one or more mobile kiosks to execute second tasks associated with the second plurality of applications, wherein the second plurality of applications includes at least one different application from the first plurality of applications based on at least one hardware difference between the at least one mobile kiosk and the one or more mobile kiosks;
identify a first task for the at least one mobile kiosk to perform at the venue;

identify a first application of the first plurality of applications for the at least one mobile kiosk to execute to perform the first task;

cause the at least one mobile kiosk to execute the first application to perform the identify a second task for the at least one mobile kiosk to perform at the venue; first task;

identify a second application of the first plurality of applications for the at least one mobile kiosk to execute to perform the second task;

determine that the at least one mobile kiosk has performed the first task; and cause the at least one mobile kiosk to execute the second application to perform the second task.

13. The at least one non-transitory computer-readable storage medium of claim 12, wherein the instructions further cause the at least one processor to:

receive user input selecting the first task; and identify the first task for the at least one mobile kiosk to perform at the venue based upon the user input.

14. The at least one non-transitory computer-readable storage medium of claim 12, wherein the instructions further cause the at least one processor to identify the first task for the at least one mobile kiosk to perform at the venue based upon a schedule.

15. The at least one non-transitory computer-readable storage medium of claim 12, wherein the instructions further cause the at least one processor to identify the first task for the at least one mobile kiosk to perform at the venue based upon an order of tasks in a dynamic task queue.

16. The at least one non-transitory computer-readable storage medium of claim 12, wherein the instructions further cause the at least one processor to:

receive new application data for a new application from an application distribution system; and cause the new application data to be uploaded on to the at least one mobile kiosk.

17. The at least one non-transitory computer-readable storage medium of claim 16, wherein the instructions further cause the at least one processor to:

identify a mobile kiosk body type associated with the at least one mobile kiosk;

determine that the mobile kiosk body type matches at least one mobile kiosk body type in the new application data indicating that the mobile kiosk body type can execute a task associated with the new application; and cause the new application data to be uploaded on to the at least one mobile kiosk based upon determining that the mobile kiosk body type matches the at least one mobile kiosk body type in the new application data.

18. The at least one non-transitory computer-readable storage medium of claim 12, wherein the instructions further cause the at least one processor to:

receive updated application data for the first application from an application distribution system; and cause the updated application data to be uploaded on to the at least one mobile kiosk.

19. A method for mobile kiosk remote administration implemented by at least one processor in communication with at least one memory, the method comprising:

uploading a first plurality of applications to at least one mobile kiosk of a plurality of mobile kiosks at a venue based upon determining that the at least one mobile kiosk has a first body type that allows the at least one mobile kiosk to execute first tasks associated with the first plurality of applications;

uploading a second plurality of applications to one or more mobile kiosks of the plurality of mobile kiosks based upon determining that the one or more mobile kiosks have a second body type that allows the one or more mobile kiosks to execute second tasks associated with the second plurality of applications, wherein the second plurality of applications includes at least one different application from the first plurality of applications based on at least one hardware difference between the at least one mobile kiosk and the one or more mobile kiosks;

identifying a first task for the at least one mobile kiosk to perform at the venue;

identifying a first application of the first plurality of applications for the at least one mobile kiosk to execute to perform the first task;

causing the at least one mobile kiosk to execute the first application to perform the first task;

identifying a second task for the at least one mobile kiosk to perform at the venue;

identifying a second application of the first plurality of applications for the at least one mobile kiosk to execute to perform the second task;

determining that the at least one mobile kiosk has performed the first task; and causing the at least one mobile kiosk to execute the second application to perform the second task.

20. The method of claim 19, further comprising:

receiving new application data for a new application from an application distribution system;

identifying a mobile kiosk body type associated with the at least one mobile kiosk;

determining that the mobile kiosk body type matches at least one mobile kiosk body type in the new application data indicating that the mobile kiosk body type can execute a task associated with the new application; and causing the new application data to be uploaded on to the at least one mobile kiosk based upon determining that the mobile kiosk body type matches the at least one mobile kiosk body type in the new application data.

* * * * *